United States Patent
Nazzer

(10) Patent No.: US 11,498,020 B2
(45) Date of Patent: Nov. 15, 2022

(54) METHOD FOR RECOVERING LIQUIDS FROM SLURRIES

(71) Applicant: Craig Nazzer, Oakura (NZ)

(72) Inventor: Craig Nazzer, Oakura (NZ)

(73) Assignee: Prime Services Trustee Limited, New Plymouth (NZ)

( * ) Notice: Subject to any disclaimer, the term of this patent is extended or adjusted under 35 U.S.C. 154(b) by 392 days.

(21) Appl. No.: 16/492,519

(22) PCT Filed: Mar. 29, 2018

(86) PCT No.: PCT/NZ2018/050040
§ 371 (c)(1),
(2) Date: Sep. 9, 2019

(87) PCT Pub. No.: WO2018/182433
PCT Pub. Date: Oct. 4, 2018

(65) Prior Publication Data
US 2021/0170308 A1     Jun. 10, 2021

(30) Foreign Application Priority Data

Mar. 29, 2017   (NZ) ........................................ 730613

(51) Int. Cl.
*B01D 21/00* (2006.01)
*B01D 29/86* (2006.01)

(52) U.S. Cl.
CPC ....... *B01D 21/0012* (2013.01); *B01D 29/865* (2013.01); *B01D 2201/202* (2013.01)

(58) Field of Classification Search
None
See application file for complete search history.

(56) References Cited

U.S. PATENT DOCUMENTS

| 2,404,215 | A | * | 7/1946 | Cavanaugh | ............ | B01D 36/02 |
|---|---|---|---|---|---|---|
| | | | | | | 210/415 |
| 3,424,674 | A | | 2/1969 | Webber | | |
| 4,547,286 | A | | 10/1985 | Hsiung | | |
| 6,015,497 | A | | 1/2000 | Steen, Jr. | | |
| 2021/0170308 | A1 | * | 6/2021 | Nazzer | .................. | B01D 29/01 |

FOREIGN PATENT DOCUMENTS

| WO | 2005102491 A1 | 11/2005 |
|---|---|---|
| WO | 2016032344 A2 | 3/2016 |

OTHER PUBLICATIONS

International Search Report & Written Opinion in PCT/NZ18/50040 dated Oct. 8, 2019.
International Preliminary Report on Patentability, dated Oct. 29, 2019.

* cited by examiner

*Primary Examiner* — Robert J Popovics
(74) *Attorney, Agent, or Firm* — Todd Martin

(57) ABSTRACT

The method relates generally to a filtration and liquid displacement method for separating valuable or harmful liquids, herein termed Process Liquid, from mixtures or slurries that contain such liquids and solid particles. The method employs upflow filtration, operation of SAP Means and use of a Sweep Liquid that has a higher density than the Process Liquid.

19 Claims, 6 Drawing Sheets

METHOD FOR RECOVERING LIQUIDS FROM SLURRIES

TECHNICAL FIELD

This invention relates generally to a filtration and liquid displacement method for recovering valuable or harmful liquids from slurries that contain such liquids and solid particles.

BACKGROUND

Many processes include the treatment of slurries comprised of liquid, herein termed "Process Liquid," and finely divided solid matter in the form of solid particles. In many cases the Process Liquid is valuable and/or potentially harmful (e.g. to people or to the environment) while the solid matter is either a waste material or is itself valuable or potentially harmful. For commercial, safety and/or environmental reasons it is often desirable to recover this Process Liquid before disposing of or making use of the solid matter. Many types of devices including gravity separators, cyclone separators, filters, clarifiers, centrifuges, and combinations thereof, are used for this purpose.

In many applications simple gravity separators produce a sludge or sediment that contains most or all of the solid matter plus a significant amount of the original Process Liquid. This can lead to the need to add further steps to the process to recover Process Liquid from said sludge or sediment. Furthermore gravity is not always an effective driving force for separation if the particles are very fine and remain suspended without settling in a timely manner.

Filters and centrifuges are typically able to recover a higher fraction of the original Process Liquid than gravity type separators. Filters are often preferred because in many applications they are simple and compact, and less costly than centrifuges. In a typical basic "dead end" filter the slurry to be filtered pushes against the filter surface, the Process Liquid flows through the filter medium and is collected on the downstream side as "filtrate" (also known as "permeate"), and the solid particles accumulate in a "retentate" on the upstream side. The accumulating solid matter initially forms a thin layer on the filter medium surface that over time builds into a thick wet filter cake.

A major drawback of filtration systems in which a filter cake is formed is the reduction in flow as the filter cake thickness increases. As more slurry is filtered, the filter cake becomes thicker, resulting in higher resistance to the flow of the liquid through the filter. The pressure difference across the filter medium must then increase to maintain a high flow rate, however increasing the pressure in a filter increases costs and potential hazards, and may not be desirable or feasible. In response to this problem the filtering process is typically periodically interrupted to remove the filter cake, after which filtration resumes. The cake is often removed by scraping, shaking, flushing or using short bursts of reverse flow to push the filter cake off the filter medium, e.g., via a backwash, backflow, gas pulse, etc. Alternatively, many filters have disposable elements such as cartridges that are replaced when caked with solid matter.

In some applications an inert fine granular substance commonly referred to as "filter aid" (also known as "precoat" or "body feed") is added to try to improve the performance of the filtration process by, for example, preventing blinding of the primary filter medium and/or increasing the permeability of the filter cake. Examples of filter aid include diatomaceous earth, perlite, cellulose and similar. A filter cake is still formed, however it now includes the added fine granular filter aid. Hence there is more solid waste to dispose of and greater loss, or at least a risk of greater loss, of valuable or harmful Process Liquid that is trapped in this waste. The associated costs and environmental risks arising from this increase in solid waste volume can be significant. There are also added costs to purchase the filter aid, plus further costs and complexity to build, operate and maintain the additional equipment needed to store and make use of the filter aid.

The residual liquid contained in a typical filter cake has essentially the same composition as the original Process Liquid that entered the filter, which in numerous applications results in the waste filter cake being contaminated by substances (e.g. the original Process Liquid) that are harmful to the environment, such as when used disposable filter elements are dumped in waste landfills.

In many conventional filter systems a washing step using water or other similar liquid can be included to remove a portion of the Process Liquid from the filter cake. In these scenarios the filter medium is typically horizontal with the filter cake on top of it. Gravity helps to hold the solid matter down while the wash liquid flows downward through the filter cake. In ideal circumstances the wash liquid would form a broad horizontal layer spanning the filter surface and move slowly evenly downwards pushing and displacing Process Liquid that is below it out of a uniformly porous filter cake and through the filter medium. In practice however the filter cake is rarely uniformly porous, resulting in uneven distribution of the flow of wash liquid, e.g. through cracks and less compacted, more permeable, parts of the filter cake, thereby failing to wash the less permeable portions of the filter cake.

This washing method is not generally suitable if the filter cake contains oils or other organic Process Liquids. A watery wash liquid may not be effective in separating the oily liquids from the solid particles. Furthermore in the majority of cases the oily Process Liquid is much less dense than water (noting that oil readily floats on water) hence it is fighting nature to expect a watery wash liquid to effectively push an oily Process Liquid downwards out of the filter cake and through the filter medium. The wash liquid will instead tend to run past the oily liquid through permeable parts of the cake and then through the filter medium thereby failing to clean the filter cake. These consequences of using wash water when filtering oily slurries are undesirable. An alternative wash liquid that has a lower density than the original Process Liquid would help to avoid the above described problems but most such alternatives are typically organic liquids that in themselves may pose problems for subsequent recovery or disposal.

Dilution washing of the filter cake is also practiced whereby the cake is broken up and thoroughly mixed with water or solvent or other wash liquid to cleanse the solid matter. This is an alternative to displacement washing. It can recover more Process Liquid and make it easier to dispose of the waste solid matter but requires much more wash liquid, and an extension to the filtration process to recover the higher filtrate volumes, as well as potentially causing greater dilution of the Process Liquid that is recovered.

When a back wash is used to detach a filter cake from filter media or when liquids are used to sluice out filtered solid matter or to clean equipment then some of the valuable or harmful Process Liquid may be swept into highly diluted waste streams from which it is often overly expensive to recover the residual Process Liquid.

Cross flow filtration is often used to try to overcome the filter cake problems by creating shear forces in the slurry at the filter medium surface that prevent a filter cake from forming. The result is a higher filtrate flow rate than would otherwise be possible if a filter cake were to form. The retentate slurry becomes thicker as Process Liquid is able to flow through the filter while the solid matter remains trapped in the slurry on the retentate side. The avoidance of a filter cake can be achieved by moving the slurry across the surface of a stationary filter medium or by moving the filter medium e.g. by rotation or oscillating back and forth. Provided that the resulting relative motion between the filter medium surface and the slurry is rapid enough, then the resulting shear forces will prevent a troublesome filter cake from forming. A thickened retentate does form but it remains flowable, and therefore usually contains a significantly higher fraction of the original Process Liquid than what would have been present in the compacted filter cake that would have been formed if a conventional dead end filtration process had instead been used. Disposal of this retentate as-is (i.e. without further processing to recover Process Liquid) in conventional cross flow filtration would result in higher loss of Process Liquid.

A conventional means for treating sludges, sediments, retentates, filter cakes and other forms of concentrated solid matter contaminated with harmful Process Liquid is to destroy the harmful liquid, e.g. by incineration, thermal oxidation, etc. This approach adds cost and complexity, and in some circumstances can increase health, safety and environmental (HSE) hazards. It also results in total loss of the residual Process Liquid.

The above drawbacks can in some circumstances be amplified if the solid matter is itself valuable or harmful. This can lead to yet more cost and complexity to thoroughly recover both the solid matter and the Process Liquid in a satisfactorily decontaminated and reusable state.

Because of the above noted drawbacks, including lost Process Liquid and potential for HSE harm, there is a need for methods that improve the degree of separation of valuable or harmful Process Liquids from slurries.

It is an object of the present method to overcome some of the above-mentioned difficulties, or to at least provide the public with a useful alternative.

SUMMARY

There is provided a method to separate Process Liquid from a slurry, termed "feed slurry", that comprises Process Liquid and solid particles. The method includes filtration performed in a reservoir in which there is a Filtering Device.

In a first aspect, there is provided a method for separating a Process Liquid from a feed slurry that includes a mixture of Process Liquid and solid particles, the method using a Sweep Liquid that has a higher density than the Process Liquid comprising the steps of:
(a) Introducing the feed slurry into a reservoir thereby creating or enlarging a Process Liquid Layer, where the reservoir includes a Filtering Device having an upstream surface and comprising one or more filter elements allowing liquid to flow through it while blocking the passage of at least a portion of the solid particles, where (a) can occur before, after or at the same time as (b), and;
(b) Introducing the Sweep Liquid into the reservoir thereby creating or enlarging a Sweep Liquid Layer below the Process Liquid Layer and an interface between the two liquid layers that lies below at least a portion of the upstream surface of the Filtering Device, where (b) can occur before, after or at the same time as (c); and
(c) continuing to introduce feed slurry and/or Process Liquid and/or Sweep Liquid into the reservoir causing the top of the Process Liquid Layer to rise and make contact with the upstream surface of the Filtering Device, and;
(d) applying a pressure differential across at least one or more of the filter elements within the Filtering Device, wherein said pressure differential is sufficient to cause liquid to flow through the Filtering Device as filtrate thereby causing Process Liquid to flow through the Filtering Device, and;
(e) operating one or more Solids Accumulation Prevention Means ("SAP Means") that are configured to prevent excessive accumulation of solid matter on or within the upstream surface of the Filtering Device, and;
(f) allowing solid particles in the Process Liquid Layer to move out of the Process Liquid Layer and into the Sweep Liquid Layer thereby separating Process Liquid from solid particles, and;
(g) raising the level of the top of the Sweep Liquid Layer within the reservoir thereby exerting upward pressure against the Process Liquid Layer thereby causing Process Liquid to flow through the Filtering Device thereby separating Process Liquid from solid particles that are blocked by the Filtering Device, and;
(h) allowing solid particles that have been separated from Process Liquid by steps (f) and (g) to accumulate in the Sweep Liquid Layer, thereby forming a mixture comprising solid particles and Sweep Liquid in the reservoir.

In one embodiment of this first aspect the one or more SAP Means are selected from the group consisting of:
moving liquid across at least a portion of the upstream surface of the Filtering Device, thereby detaching solid matter that has accumulated onto the upstream surface of the Filtering Device and/or preventing solid matter from accumulating onto the upstream surface of the Filtering Device;
rapidly moving the Filtering Device thereby detaching solid matter that has accumulated onto the upstream surface of the Filtering Device and/or preventing solid matter from accumulating onto the upstream surface of the Filtering Device;
moving a brush or blade across at least a portion of the upstream surface of Filtering Device thereby detaching, pushing or sweeping solid matter off the upstream surface of the Filtering Device;
moving the Filtering Device so that at least a portion of its upstream surface passes close to a brush or blade thereby detaching, pushing or sweeping solid matter off the upstream surface of the Filtering Device;
applying a reverse flow or back pulse or back wash of liquid or gas backwards through the Filtering Device thereby detaching solid matter that has built up on or within the upstream surface of the Filtering Device;
applying jolts, knocks, accelerations or vibrations to the Filtering Device or to the reservoir or to the slurry close to the Filtering Device thereby detaching solid matter from the upstream surface of the Filtering Device;
configuring and/or adapting the upstream surface of the Filtering Device to repel, or at least reduce or resist the adherence of, solid matter;

reducing the liquid flow rate through the Filtering Device thereby enabling gravity to cause solid particles in the liquid below the Filtering Device to settle;

causing solid matter that has accumulated onto the upstream surface of the Filtering Device to dissolve, melt, slide along, fall away or otherwise detach from, the upstream surface of the Filtering Device;

any combination thereof

In a second aspect, there is provided a method for separating a Process Liquid that includes one or more water miscible liquid components from a feed slurry that comprises said Process Liquid and solid particles, the method comprising;

(a) placing the feed slurry comprising Process Liquid and solid particles into a reservoir, and;

(b) introducing beneath at least a portion of the feed slurry a Sweep Liquid having a density greater than the density of the Process Liquid and which comprises one or more liquid components that are water miscible, and;

(c) allowing at least a portion of the introduced Sweep Liquid to move upwards through at least a portion of the feed slurry, wherein the passage of the portion of Sweep Liquid through the portion of the feed slurry displaces and lifts upwards at least a portion of the Process Liquid, and;

(d) allowing at least a portion of the displaced and upwardly lifted Process Liquid to flow through a Filtering Device having an upstream surface and configured to block the passage of at least a portion of the solid particles in the feed slurry, thereby separating at least a portion of the Process Liquid from at least a portion of the feed slurry.

One embodiment of this second aspect includes the additional step of operating a SAP Means to prevent excessive accumulation of solid matter on or within the upstream surface of the Filtering Device.

By way of example only, the method described herein includes, but is not necessarily limited to, the following elements:

a) Upflow Orientation.

The Filtering Device (item 1 in FIGS. 1 and 2 and item 24 in FIGS. 4 and 5) that is configured to block the passage of at least a portion of the solid particles in the feed slurry while allowing liquid to flow through it, is positioned in the reservoir (item 28 in the Figures) such that fluids that enter the Inlet Chamber (item 2 in the Figures) then generally move upwards to reach the upstream surface of Filtering Device (1, 24).

b) Solids Accumulation Prevention Means.

The method includes one or more Solids Accumulation Prevention Means, herein abbreviated to "SAP Means", that are configured to prevent excessive accumulation of solid matter on or within the upstream surface of Filtering Device (1, 24).

c) Process Liquid Replaced by Sweep Liquid. Feed slurry and a Sweep Liquid that has a density that is higher than that of the Process Liquid are introduced into Inlet Chamber (2) so as to essentially fill Inlet Chamber (2) up to the level of Filtering Device (1, 24). This filling step is done in such a manner so as to create a layer of liquid in contact with the upstream surface of Filtering Device (1, 24) that predominantly comprises Process Liquid, herein termed Process Liquid Layer (item 14 in the Figures) floating above a layer of liquid that predominantly comprises Sweep Liquid, herein termed Sweep Liquid Layer (item 15 in the Figures). The Sweep Liquid Layer (15) lies below the Process Liquid Layer (14) because the Sweep Liquid has a higher density than the Process Liquid. Solid particles that entered the reservoir in the feed slurry are initially distributed within the Process Liquid Layer (14). One or more filtration steps are performed while said Process Liquid Layer (14) is in contact with the upstream surface of Filtering Device (1, 24). During at least one of said filtration steps Sweep Liquid flows into Inlet Chamber (2), increasing the volume of Sweep Liquid Layer (15) and thereby pushing and displacing Process Liquid out of Inlet Chamber (2) and through Filtering Device (1, 24). Filtration continues until the desired amount of Process Liquid has been displaced by Sweep Liquid, pushed through Filtering Device (1, 24) and collected as filtrate in Outlet Chamber (3). As a result of the filtration step, the solid particles on the upstream side of Filtering Device (1, 24) become immersed in liquid that is now mostly Sweep Liquid and depleted of Process Liquid.

d) Solid Particles Move from the Process Liquid and into the Sweep Liquid In many applications of the method described herein the density of the solid matter that the solid particles in the feed slurry are comprised of (i.e. ignoring the density of liquid that may be adhering to the surfaces of the particles) is higher than the density of the Sweep Liquid. In such applications and during the steps of the method when there is both a Sweep Liquid Layer (15) and a Process Liquid Layer (14) in Inlet Chamber (2), some solid particles may move (e.g. under the influence of gravity) from the Process Liquid Layer (14) and into the Sweep Liquid Layer (15), thereby further enhancing the effectiveness of the method in separating Process Liquid from solid particles in slurries. Embodiments of the method are described later below that encourage this helpful movement of particles into the Sweep Liquid Layer (15).

Novel features that are believed to be characteristic of the method will be better understood from the detailed description of the method when considered in connection with any accompanying figures and examples.

BRIEF DESCRIPTION OF THE DRAWINGS

A more complete understanding of the principles of the present method may be obtained by reference to the figures in which corresponding reference numbers indicate corresponding parts or features, and wherein.

DETAILED DESCRIPTION

The following description sets forth numerous exemplary configurations, parameters, and the like. It should be recognised, however, that such description is not intended as a limitation on the scope of the present method, but is instead provided as a description of exemplary embodiments.

A method has been discovered to separate Process Liquid from a slurry, termed "feed slurry", that comprises Process Liquid and solid particles. The method includes filtration performed in a reservoir (28) containing a Filtering Device (1, 24). The method also includes operation of SAP Means configured to prevent excessive accumulations of solid matter on or within the upstream surface of Filtering Device (1, 24). The method also uses a Sweep Liquid that has a density that is higher than that of the Process Liquid.

The typical application of the method is for recovery of Process Liquid that may be valuable or harmful (e.g. to people or the environment) from feed slurries that contain said Process Liquid and particles of waste solid matter. However a person skilled in the art will recognise from the description presented herein that the method can also be used in some applications where the particles of solid matter are deemed to be valuable or harmful (e.g. catalyst particles, filtration media, proppant, molecular-sieve beads, ground minerals, product from crystallisation processes, radioactive material, toxic solid substances, and so on).

Figure 1:
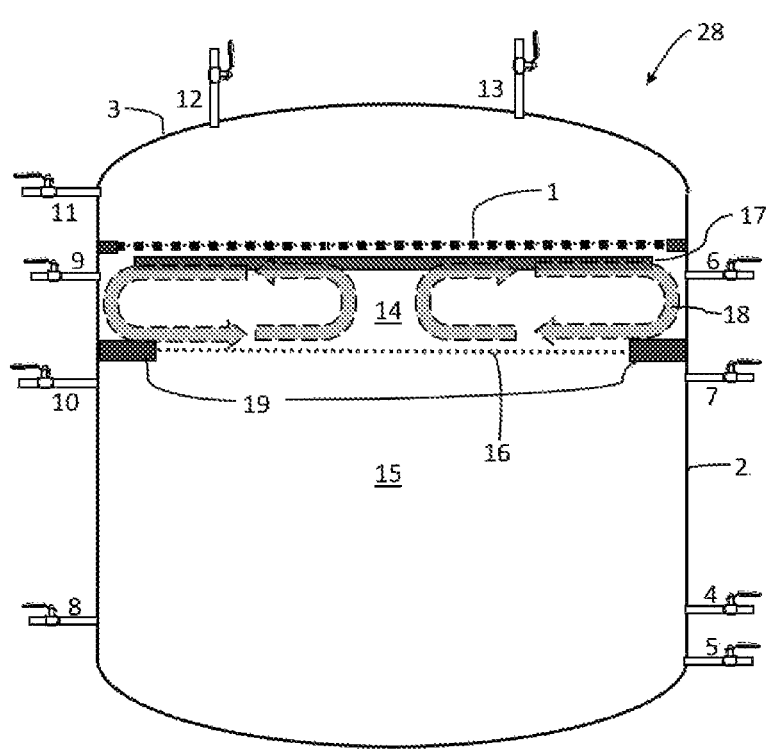
FIG. 1 shows one embodiment of the method comprising use of a Filtering Device having one filter element, and an Agitator.

FIG. 1 and the following paragraphs describe how the method works in one of several embodiments. Referring to FIG. 1 the process takes place in a reservoir (28) in which there is a Filtering Device (1) that allows liquids to flow through it when sufficient differential pressure is applied across the Filtering Device (1) while blocking the passage of at least some of the solid particles in the feed slurry. Below Filtering Device (1) there is an Inlet Chamber (2) while the upper part of reservoir (28) above Filtering Device (1) serves as Outlet Chamber (3). Hence in the method the filtration flow direction is generally upwards through Filtering Device (1) and into Outlet Chamber (3).

In this specification this generally upward movement of fluids towards Filtering Device (1, 24) is termed "upflow filtration" although there can be localised different flow directions close to or within Filtering Device (1, 24) (some examples of which are described below under the heading Double Sided Filter Elements).

Figure 2:
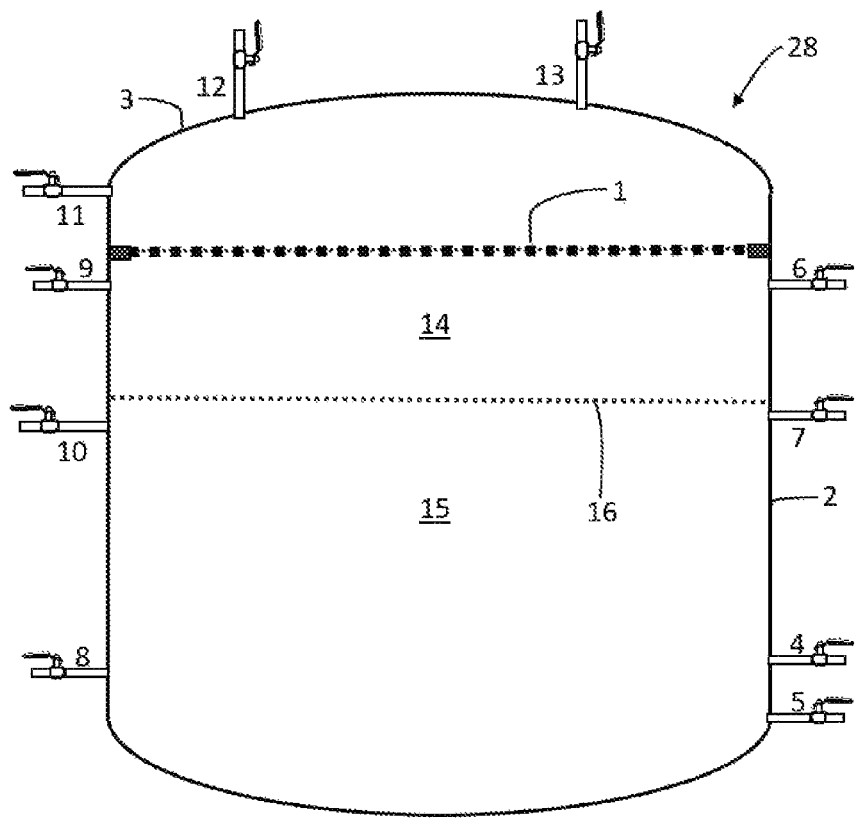
FIG. 2 shows another embodiment of the method comprising use of a Filtering Device having one filter element, and without an Agitator.

The term "Filtering Device" as used in this specification comprises one or more porous filter elements that do the filtering. Associated supporting and sealing components will typically also be present to, for example, withstand the pressures at which the method is performed and to prevent bypassing so that the liquid that flows from Inlet Chamber (2) to Outlet Chamber (3) through Filtering Device (1, 24) passes through the filter element(s). An upflow filtration configuration such as that shown in FIGS. 1 and 2 is not common for a dead end filtration process, one reason being that accumulations of solid matter that are expected to form a filter cake (which is a common feature in dead end filtration) could instead fall by gravity off the underside of the filter surface.

A person skilled in the art will recognise that the method does not require Inlet Chamber (2), Outlet Chamber (3) or Filtering Device (1, 24) to be a particular shape or size. The particular application by its users will largely govern whether the components should be, for example, circular in cross section, or square or any other shape, regular or irregular. It should be understood that the Figures are conceptual. It is to be appreciated that the Figures are not limiting and that the method encompasses all viable shapes and sizes of the components.

The main purpose of Inlet Chamber (2) is to receive and hold slurry and Sweep Liquid while the main purpose of Outlet Chamber (3) is to receive and hold filtrate, which could include Process Liquid, Sweep Liquid or a mixture of the two, that flows from Inlet Chamber (2) and through Filtering Device (1, 24).

The Inlet Chamber (2) in FIG. 1 has connections to allow slurry, Sweep Liquid and other liquids to enter and exit Inlet Chamber (2). By way of example only FIG. 1 shows seven such fluid connections (4 to 10): a lower slurry inlet (4), a lower Sweep Liquid inlet (5), an upper slurry inlet (6), an upper Sweep Liquid inlet (7), a lower outlet (8) for any fluid, an upper slurry outlet (9) and an upper Sweep Liquid outlet (10). In theory it may not be necessary to have this many connections in some non-limiting embodiments. However for reliable, efficient, simple etc operation the user may choose to have the separate connections as shown in FIG. 1, or possibly fewer or more connections, for each fluid and for different entry and exit locations. A person skilled in the art will know that other standard components (not shown in FIG. 1 for clarity) may also be necessary, including drains, vents, valves, instrumentation, access means for maintenance, and so on.

The Outlet Chamber (3) in FIG. 1 has at least one filtrate outlet (11) for removing filtrate or other liquids from Outlet Chamber (3). In some applications it may be advantageous to periodically flow liquid or gas backwards through Filtering Device (1, 24) (e.g. for unclogging the filter pores), and by way of example only, FIG. 1 also shows an optional extra fluid inlet connection (12) for this purpose.

In order to push filtrate through Filtering Device (1, 24) the fluid pressure in Inlet Chamber (2) must be greater than that in Outlet Chamber (3) to a degree that overcomes the fluid flow resistance of Filtering Device (1, 24). This pressure differential between Inlet Chamber (2) and Outlet Chamber (3) is commonly termed "trans membrane pressure" (herein abbreviated to "TMP"). Because of the upflow orientation a person skilled in the art would note that Inlet Chamber (2) is normally fully filled with fluid up to Filtering Device (1, 24) to enable filtrate to flow through Filtering Device (1, 24). The TMP can then be generated by using a pump or head of liquid operating at the desired pressure to push slurry or liquid through one or more of the fluid connections (4 to 10) into Inlet Chamber (2). A further optional way to increase or create the TMP is to pull a vacuum in Outlet Chamber (3) and FIG. 1 shows an optional vacuum connection (13) for this purpose.

Solids Accumulation Prevention Means—SAP Means

The method described herein also includes operation of one or more "Solids Accumulation Prevention Means", herein abbreviated as "SAP Means" throughout this specification, that are configured to prevent the formation of excessive accumulation of solid matter on or within the upstream surface of Filtering Device (1, 24).

The method can include all practicable SAP Means that either acting alone or in combination with other SAP Means are configured to achieve the objective of preventing said unwanted excessive accumulation of solid matter on or within the upstream surface of Filtering Device (1, 24), including but not limited to the following types of SAP Means:

a) Moving an agitator so as to cause slurry that is close to one or more of the filter elements in Filtering Device (1, 24) to move rapidly across the upstream surface of Filtering Device (1, 24). Said agitator movement could be rotation (continuously in one direction or switching between clockwise and counter-clockwise), or linearly back and forth, or vibration or other cyclic motion that achieves the desired result of creating relative movement between the slurry and Filtering Device (1, 24) that is rapid enough to prevent the unwanted excessive accumulation of solid matter on or within the upstream surface of Filtering Device (1, 24).

b) Moving one or more of the filter elements in Filtering Device (1, 24) rapidly to create inertial forces and/or high shear forces between the moving upstream surface of Filtering Device (1, 24) and nearby fluids. Said Filtering Device (1, 24) motion could be rotation (continuously in one direction or switching between clockwise and counter-clockwise), or linearly back and forth, or vibration or other cyclic motion that is vigorous enough to achieve the desired result of preventing the formation of excessive accumulations of solid matter on or within the upstream surface of Filtering Device (1, 24).

c) Moving a brush or blade or other suitably shaped bar across at least a portion of the upstream surface of Filtering Device (1, 24) so as to detach, push or sweep solid matter from the upstream surface of Filtering Device (1, 24).

d) Moving Filtering Device (1, 24) so that at least a portion of its upstream surface passes over a brush or blade or other suitably shaped bar that then detaches, pushes or sweeps solid matter, if present, off the upstream surface of Filtering Device (1, 24).

e) Using an external pump to create high turbulence and/or shear in the fluid close to Filtering Device (1, 24). One non-restrictive example of a way to do this is to allow slurry to flow out of Inlet Chamber (2) (e.g. via slurry outlet item (9) in FIG. 1) and into the suction side of a pump which would then push the slurry back in (e.g. via slurry inlet item (6) in FIG. 1) to flow at high velocity across the upstream surface of Filtering Device (1, 24).

f) Applying a reverse flow or back pulse or back wash of liquid or gas backwards through Filtering Device (1, 24) so as to detach solid matter that has built up on or within the upstream surface of the Filtering Device (1, 24). The detached solid matter could then settle by gravity away from Filtering Device (1, 24) and/or be carried or swept away by relative motion (if present) between Filtering Device (1, 24) and the slurry that is close to Filtering Device (1, 24). In some applications it may be advantageous to include as components of said reverse flow or back pulse or back wash fluid one or more substances selected from a wider group of substances herein termed "adhesion disruptors" (as defined below) that soften or dissolve or otherwise aid the detachment of solid matter that could be blocking or impeding the flow of filtrate through the pores of the filter element(s) in Filtering Device (1, 24).

g) Applying knocks or jolts or accelerations or vibrations to the Filtering Device (1, 24) or to the reservoir itself or to the slurry close to Filtering Device (1, 24) to detach at least a portion of any solid matter that is adhering to the upstream surface of Filtering Device (1, 24) which could then settle by gravity away from Filtering Device (1, 24) and/or be carried or swept away by relative motion (if present) between Filtering Device (1, 24) and the slurry that is close to Filtering Device (1, 24).

h) Configuring and/or adapting the upstream surface of the Filtering Device (1, 24) to repel, or resist the adherence of, solid matter so that solid matter is repelled or falls off by gravity or is readily detached by relative motion between Filtering Device (1, 24) and the slurry that is close to Filtering Device (1, 24). The user of the method could, for example, consider: non-stick Filtering Device (1, 24) materials of construction (e.g. PTFE); application of a surface treatment or coating; use of electrostatic or magnetic charge, and so on.

i) Gravity alone is a type of SAP Means because it tends to pull solid matter down and away from Filtering Device (1, 24). This applies to both the solid particles in the feed slurry and accumulations of solid matter on Filtering Device (1, 24).

j) Operate at a filtrate flow rate that is low enough to allow at least some solid particles in Inlet Chamber (2) to settle.

k) Inject one or more adhesion disruptors to the fluid in Inlet Chamber (2) so as to initiate, enhance or otherwise aid the separation of solid matter from the upstream surface of Filtering Device (1, 24). Fluid containing the injected adhesion disruptor could, for example in one non-limiting embodiment, flow along the upstream surface of Filtering Device (1, 24) so as to cause solid matter, if present in the form of an accumulation on or within the upstream surface of Filtering Device (1, 24), to dissolve, break-up, melt, or otherwise become separated from Filtering Device (1, 24).

l) Heat or cool the upstream surface of Filtering Device (1, 24) or the fluid in contact with the upstream surface of Filtering Device (1, 24) to detach excessive accumulations of solid matter from the upstream surface of Filtering Device (1, 24).

m) A combination of the above types.

A person skilled in the art will recognise that the above list of examples of types of SAP Means illustrates that there can be many potential ways to achieve the desired objective of preventing excessive accumulations of solid matter. Some SAP Means require additional items of apparatus (e.g. type a) above requires the presence and operation of an agitator and a mechanism to move the agitator) whereas other SAP Means only comprise making adjustments to how the steps of the method are performed (e.g. type j) above only entails operating at a low filtrate flow rate). Not all types of SAP Means will be suitable for every application. The selection of the best type of SAP Means, or best combination of types, can vary widely depending upon the application, the characteristics of the solid matter, the properties of the Process Liquid, HSE considerations, implementation cost, and so on. The upflow filtration configuration generally helps by enabling the force of gravity to assist the separation of solid matter from the Filtering Device (1, 24).

The SAP Means not only maintains high flowrate through Filtering Device (1, 24) at conventional typical values of TMP it also potentially enables operation at significantly higher TMP than what is typically possible with conventional dead end filtration, thereby providing a further boost to throughput. In conventional filters in which a filter cake is produced, there is typically a limit as to how high the TMP can be raised when attempting to maintain high filtrate flow rates. One reason for this limit is that as the TMP rises the filter cake becomes more compressed with a consequential increase in the resistance to filtrate flow. A typical recommended maximum TMP for many types of filter cakes is about 3 bar.

Even with cross flow filtration such TMP limits are also frequently encountered. For example in a webinar on cross flow filtration presented by Mr Alan Gabelman published by Chemical Engineering journal on 1 Nov. 2016 a typical maximum recommended TMP for cross flow micro-filtration is 1 bar because a high TMP can, at least in some cases, create a "gel" or "polarisation" layer that negates the benefit of raising the TMP to high levels.

In one non-limiting embodiment of the method a pressure differential, or TMP, of between 2 and 5 bar is applied across Filtering Device (1, 24), and preferably over 5 bar which is expected to be feasible in many applications provided the components are strong enough to withstand this pressure, which in turn would typically result in higher filtrate flow rates than what would be possible when using a conventional filter of the same area having the above noted lower TMP limits.

The ability to use a high TMP also enhances the feasibility and advantages of using filter element(s) in Filtering Device (1, 24) that have a smaller effective pore size, thereby enabling the separation of Process Liquid from slurries containing smaller particles. The use of smaller pore sizes can also reduce the risk of pore clogging by preventing particles from penetrating and plugging the pores of the filter element(s) in Filtering Device (1, 24).

Embodiments Depicted in FIGS. 1 and 2

FIG. 1 shows an example of an embodiment in which there is a SAP Means of type a), namely an Agitator (17), and in this particular configuration Agitator (17) is rotatable. Said Agitator (17) is positioned and configured with blades, arms, or vanes and the like and is rotated, thereby causing slurry that is close to Filtering Device (1, 24) to move in a circular direction while also spiraling outwards across the upstream surface of Filtering Device (1) so as to prevent the formation of a thick filter cake or other excessive accumulation of solid particles on Filtering Device (1). The motor, drive shaft and other components needed to support and rotate Agitator (17) are omitted from FIG. 1 for clarity.

As shown in FIG. 1 the slurry in Process Liquid Layer (14) that Agitator (17) moves horizontally outward is deflected downwards by the wall of Inlet Chamber (2). FIG. 1 includes a "Slurry Deflector" (19) that then deflects the downward flow of slurry back towards the centre from whence it rises towards the central inlet region of rotating Agitator (17) to again be pushed spirally outward across the surface of Filtering Device (1). One example, of several possibilities, for the shape of Slurry Deflector (19) is a circular annular ring as shown in FIG. 1 that blocks the downward movement of the slurry along the wall of Inlet Chamber (2) and turns it inward. Typically the fluid below Slurry Deflector (19) will be less disturbed by the turbulence caused by Agitator (17) than the fluid above it. Slurry Deflector (19) can include vanes or plates or baffles and the like that further restrict the transmission of the circular fluid motion created by Agitator (17) to the fluid below Slurry Deflector (19). As explained further below, Slurry Deflector (19) and the recirculating slurry flow pattern (18) can help the Sweep Liquid strip Process Liquid from the surfaces of solid particles in the slurry. This can occur when the top of the Sweep Liquid Layer (15) is at approximately the same level as Slurry Deflector (19) thereby exposing some solid particles to the stripping action of the Sweep Liquid and causing some solid particles to move from Process Liquid Layer (14) into Sweep Liquid Layer (15). The term "stripping recirculating flow pattern" refers to a recirculating slurry flow pattern in which the slurry comes into contact with Sweep Liquid thereby causing some solid particles to move from the Process Liquid Layer and into the Sweep Liquid Layer.

FIGS. 1 and 2 show by way of a dotted line, herein termed "interface" (16), an indicative example of the extent of the Process Liquid Layer (14) and Sweep Liquid Layer (15). This interface (16) may at times resemble a sharply defined boundary if, in the absence of turbulence, the Process Liquid and Sweep Liquid are not more than sparingly soluble in each other. If the Process Liquid and Sweep Liquid are more soluble in each other then, if mixing has occurred, this interface can become wider as it contains a miscible mixture of the two liquids in varying concentrations, but noting, as explained further below, that the density difference between the two liquids ensures that the liquid in the Process Liquid Layer (14) above interface (16) still mostly comprises Process Liquid and the liquid in the Sweep Liquid Layer (15) below interface (16) still mostly comprises Sweep Liquid. This interface is shown notionally in FIGS. 1 and 2 simply to assist in the explanation of how the method works, and should be viewed as a "snapshot" or non-limiting example of a possible location for said interface (16). As will be apparent from the descriptions of the method this interface (16) typically moves and it could be at a different elevation in Inlet Chamber (2) from that shown in FIGS. 1 and 2, or not be present at all during some steps of the method. FIG. 1 shows, by way of non-limiting example only, how having interface (16) at or near the same level as Slurry Deflector (19) can enable the recirculating slurry flow pattern (18) to become a stripping recirculating flow pattern.

To be clear the method applies to Process Liquids and Sweep Liquids that may be less than sparingly soluble in each other, or significantly soluble in each other, or miscible with each other. The degree of said solubility of the two liquids with each other is likely to affect the nature and thickness of the interface (16). However, the method is not limited to any particular solubility of the Process Liquid and Sweep Liquid in each other.

A person skilled in the art will recognise that there are several ways, such as by conventional instrumentation, to monitor the level of the interface (16) between the Sweep Liquid Layer (15) and the Process Liquid Layer (14) and to then maintain the position of Slurry Deflector (19) at or close to the same level. For example Slurry Deflector (19) could be movable in which case it would be moved vertically to follow changes in the level of the interface (16). The user could also adjust the flow of feed slurry, Process Liquid and/or Sweep Liquid into and/or out of Inlet Chamber (2) to control the level of the interface (16) so that it matches the level of Slurry Deflector (19). These same methods can also be used to move either Slurry Deflector (19) or the interface (16) to other positions within Inlet Chamber (2).

It is to be appreciated as well that in some applications in which the Process Liquid and Sweep Liquid have a large difference in density and are not more than sparingly soluble in each other the recirculating slurry flow pattern (18) can optionally be created without Slurry Deflector (19). This can, for example, occur when slurry that is moving down along the wall of Inlet Chamber (2) due to operation of a SAP Means (e.g. movement of an agitator similar to Agitator (17) in FIG. 1) reaches the top of the Sweep Liquid Layer (15) it may penetrate the Sweep Liquid Layer (15) to a limited degree, but will not dissolve in the Sweep Liquid, and, due to its lower density, it will rise again back to the top of the Sweep Liquid Layer (15), assuming it does not form an emulsion, and then flow inwards along the top surface of the Sweep Liquid Layer (15), thereby enabling Sweep Liquid to contact and, potentially strip Process Liquid from, at least some solid particles.

The above detailed descriptions show how, in at least one embodiment of the method, at least a portion of the slurry in the Process Liquid Layer moves in a stripping recirculating flow pattern thereby causing solid particles to make contact with Sweep Liquid and move from the Process Liquid Layer into the Sweep Liquid Layer.

As noted previously it is not essential to use an agitator as the SAP Means. The characteristics and objectives of each particular application of the method will guide the selection of the most appropriate SAP Means. The method includes the presence and operation of an effective SAP Means and therefore includes all viable choices for the SAP Means including the types a) to m) listed previously under the heading Solids Accumulation Prevention Means.

In some non-limiting applications without Agitator (17) there is also no need for Slurry Deflector (19) and no need for a recirculating slurry flow pattern (18). FIG. 2, by way of example only, illustrates another embodiment in which these features are deleted.

Thickening and Sweep Mode

One mode of operation is "Thickening" during which Process Liquid is recovered by upflow filtration. This reduces the amount of Process Liquid in the feed slurry in Inlet Chamber (2), which is typically expressed as increasing the percentage solids content of the slurry. For example a feed slurry having 0.001 to 10% solids content could typically be thickened to a higher solids concentration in one non-limiting embodiment over 15 wt % and preferably over 30 wt %. During Thickening the formation of a filter cake or other troublesome accumulation of solid matter on Filtering Device (1, 24) is prevented by operating the SAP Means as described above.

Another mode of operation of the method is "Sweep Mode" during which Sweep Liquid, which has a higher density than the Process Liquid, enters Inlet Chamber (2) to create or enlarge a Sweep Liquid Layer (15) below the Process Liquid Layer (14) in Inlet Chamber (2). The rising level of the Sweep Liquid in Sweep Liquid Layer (15) exerts upward pressure against the underside of the Process Liquid Layer (14) thereby forcing Process Liquid to flow as filtrate through Filtering Device (1, 24) into Outlet Chamber (3). The solid matter that Filtering Device (1, 24) is configured to block or intercept cannot pass through Filtering Device (1, 24) hence this upward movement of Sweep Liquid also displaces Process Liquid from the spaces between, and in one non-limiting embodiment from the surfaces of, the solid particles. During Sweep Mode the formation of an excessive accumulation of solid matter on Filtering Device (1, 24) is avoided by operating the SAP Means.

Sweep Mode continues until a satisfactory amount of Process Liquid has been collected as filtrate in Outlet Chamber (3). At this stage of the method the retentate on the upstream side of Filtering Device (1, 24) is depleted of Process Liquid and mainly comprises Sweep Liquid and solid matter that had been in the feed slurry. In many applications in which neither the solid matter nor the Sweep Liquid are deemed to be valuable or harmful, this retentate can be disposed of as-is without further treatment. For some applications this retentate contains less liquid and has higher percentage solids content than the feed slurry (i.e. it has been thickened), or it may have about the same solids content, or it may have lower solids content such as can be the case when extra Sweep Liquid is used. Use of large quantities of Sweep Liquid can be desirable in some applications if this helps recover more Process Liquid and if the Sweep Liquid is low cost and harmless, which is often the case when the Sweep Liquid is mostly comprised of water.

Double Sided Filter Elements

FIGS. 1 and 2 depict by way of example only a Filtering Device (1) that comprises an approximately horizontal porous plate or sheet or single layer of filtration media or the like. However other filter types can also be used. For example Double Sided Filter Elements whereby liquid enters from both sides and is collected as filtrate in hollow interior cavities are also feasible and in many applications preferred. A Double Sided Filter Element could comprise an assembly of porous sheets, supports and sealing hardware.

Figure 3:
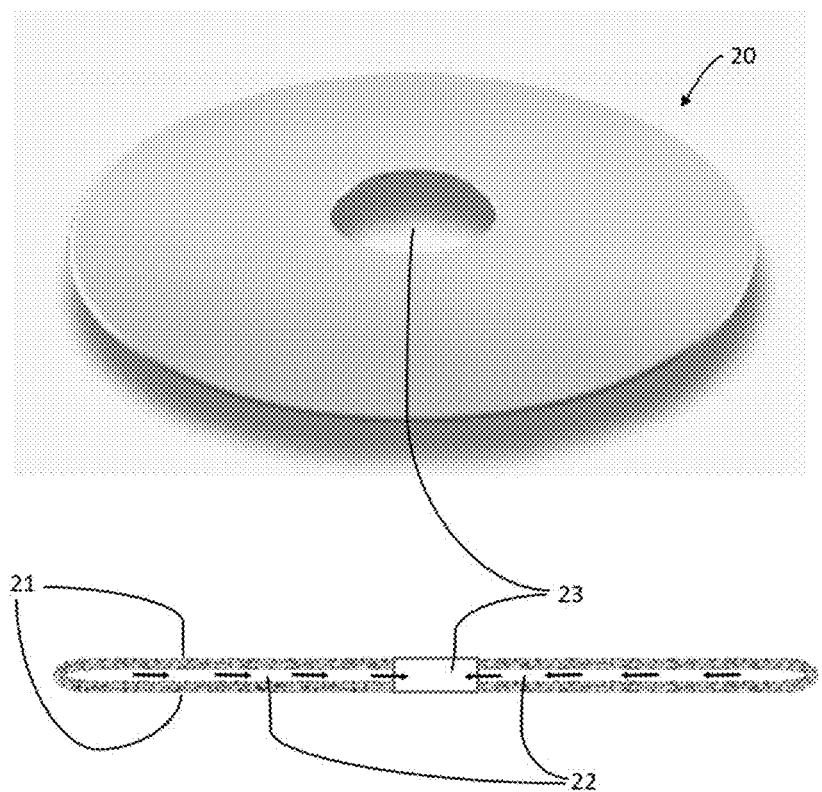
FIG. 3 shows a double sided ceramic disc filter element that can be used in the one or more embodiments of this method.

Alternatively, formed (e.g. cast or sintered) porous ceramic materials have been found to be a suitable substance for this purpose. Kerafol-Keramische Folien GmbH is a major manufacturer of this type of Double Sided Filter Element based on a design described in U.S. Pat. No. 5,730,869, incorporated herein by reference in its entirety. FIG. 3 shows an example of a double sided ceramic disc filter element (20) supplied by Kerafol to the Applicant for use in Applicant's experiments. As shown in FIG. 3 filtrate flows through upstream surface (21), which extends over both sides of the ceramic disc. The filtrate collects in hollow interior filtrate channels (22) within the filter element and then flows towards a filtrate port (23) from which it can be carried away by a filtrate collection tube (not shown for clarity on FIG. 3). For more details about this type of Double Sided Filter Element refer to U.S. Pat. No. 5,730,869 and Kerafol-Keramische Folien GmbH website.

Double Sided Filter Elements can be useful because they can significantly increase the effective filtration flow area.

Figure 4:
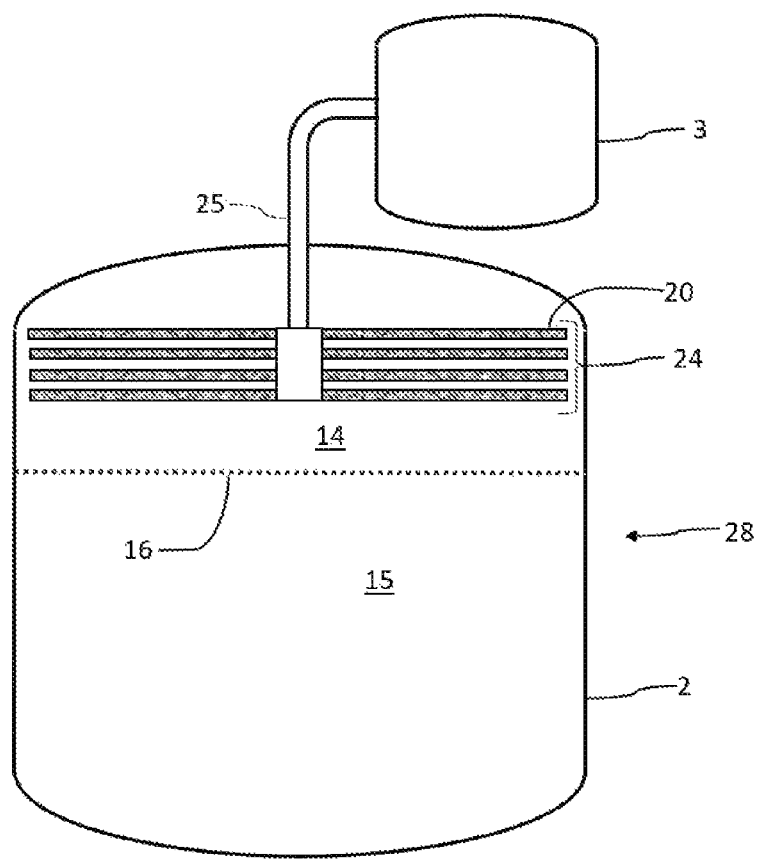
FIG. 4 shows one embodiment of the Filtering Device of the method that comprises several double sided ceramic disc filter elements of the type shown in FIG. 3.

FIG. 4 shows a non-limiting example of a Filtering Device (24) using a stack of circular Double Sided Filter Elements similar to that shown in FIG. 3. As can be seen filtrate is collected in the hollow interior filtrate channels (22) of the double sided ceramic disc filter elements (20) and the collected filtrate can then flow through one or more filtrate collection tubes (25) into Outlet Chamber (3). In this configuration (and that shown in FIG. 5) Outlet Chamber (3) is outside of reservoir (18) whereas in the configurations shown in FIGS. 1 and 2 it is inside the reservoir. In all configurations the primary function of Outlet Chamber (3) remains the same, i.e. to receive and hold filtrate. Note that despite some parts of the upstream surfaces of Filtering Device (24) facing upwards in FIG. 4 (i.e. the upper sides of the filter elements) most of the fluids in Inlet Chamber (2) still generally move upwards to reach the filter elements in Filtering Device (24) hence the upflow filtration orientation is retained.

FIG. 4 should be viewed with the understanding that the remaining features of the method that are described under the heading Embodiments Depicted in FIGS. 1 and 2 have been omitted for clarity. For example there will still be a SAP Means of some type and there may be or might not be a recirculating slurry flow pattern. A person skilled in the art will recognise that some features of the SAP Means may become more complex, e.g. to avoid excessive accumulations of solid matter onto the upper surfaces of the filter elements shown in FIGS. 3 and 4. Feasible methods to do this exist. For example, in WO2016032344 FIG. 2 shows the same double sided circular filter discs as that shown in FIG. 3 of the present specification, and FIG. 1 of that reference shows a stack of two such circular filter discs and an agitator having blades that occupy the space between the two filter discs and are configured to move solid matter away from both the lower surface of the upper disc and the upper surface of the lower disc. A similar SAP Means can be applied to the stack of Double Sided Filter Elements shown in FIG. 4 of the present specification. Alternatively the stack of Double Sided Filter Elements can be rotated to create the desired relative movement between Filtering Device (24) and the nearby slurry. Furthermore a person skilled in the art will recognise that several of the other SAP Means described previously can be adapted to suit the stack of Double Sided Filter Elements shown in FIG. 4.

It is to be appreciated that even if the upper surfaces of the filter elements shown in FIG. 4 are allowed to plug and become relatively impervious, the remaining downward facing surfaces provide on their own a significant increase in filter area when compared to the embodiments shown in FIGS. 1 and 2.

Figure 5:
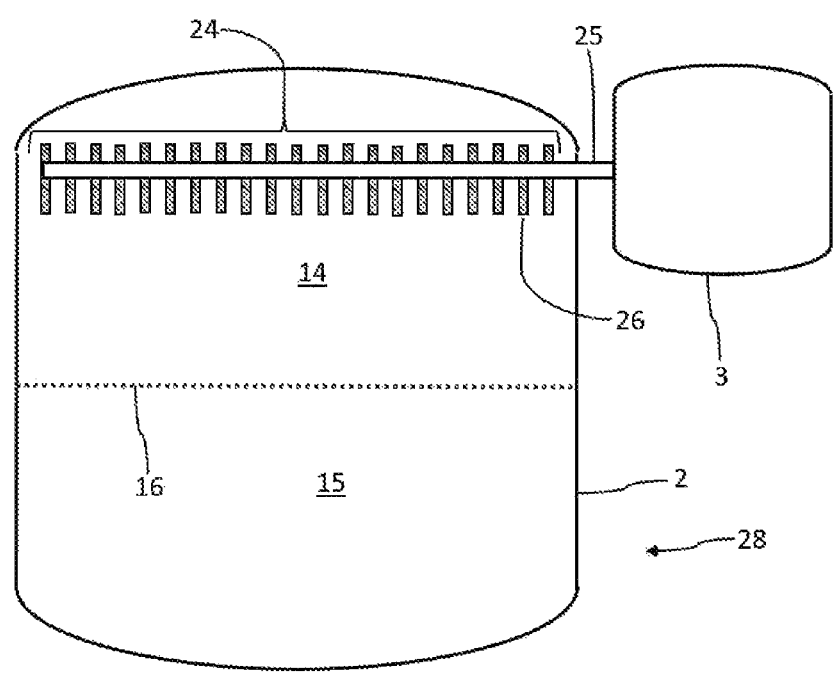
FIG. 5 shows one embodiment of the Filtering Device of the method that comprises an arrangement of Double Sided Filter Elements of the type shown in FIG. 6.
Figure 6:
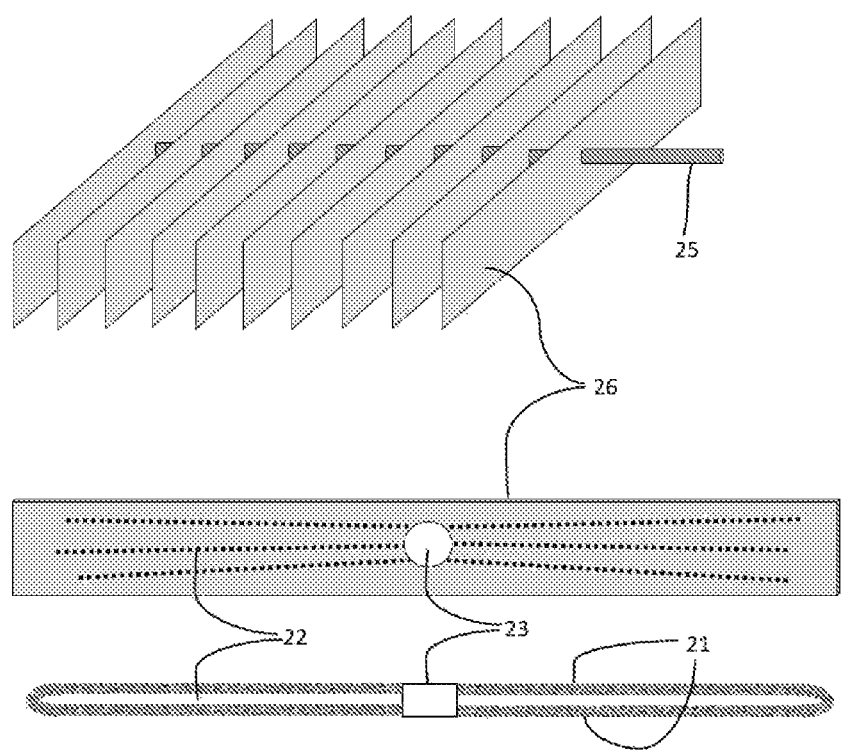
FIG. 6 shows schematically more detail around the arrangement of Double Sided Filter Elements shown in FIG. 5.

FIGS. 5 and 6 show another example comprising a wide horizontal array of long rectangular Double Sided Filter Elements. As shown in FIG. 6 each rectangular filter element (26) allows liquid to flow in from both sides, and then through hollow interior filtrate channels (22) to a filtrate port (23) in a manner that resembles that shown in FIG. 3. The filtrate ports of the filter elements are connected together by one or more filtrate collection tubes (25) which transport the filtrate to an Outlet Chamber (3) from which the filtrate can be readily recovered. In FIGS. 5 and 6 each porous side of the upstream surface of each rectangular filter element (26) forms a long rectangle that would typically span Inlet Chamber (2), but noting there is a wide range of feasible shapes.

Note that despite the presence of vertical upstream filter surfaces, the depth of the array of elements shown in FIG. 5 is relatively small and occupies only a relatively small fraction of the total depth of Inlet Chamber (2) hence the upflow filtration orientation is retained.

FIG. 5 should be viewed with the understanding that the remaining features that were previously described under the heading Embodiments Depicted in FIGS. 1 and 2 have been omitted for clarity. For example there will still be a SAP Means of some type and there may be or might not be a slurry recirculation flow pattern. Again a person skilled in the art will recognise that some features may require modifications e.g. to enable the SAP Means to avoid excessive accumulations of solid matter on the vertical surfaces of the Double Sided Filter Elements, but this would be within the capability of a person skilled in the art.

The use of multiple filter elements such as the one or more double sided elements (20, 26) shown in FIGS. 3 to 6, can significantly increase the available filtration flow area when compared to the single layer Filtering Device (1) shown in FIGS. 1 and 2. In the non-limiting example shown in FIG. 4 (which shows 4 filter elements, but noting that there is no theoretical limit to the feasible number of filter elements) the flow area is close to 8 times higher if all upper and lower filter surfaces remain effective, or nearly 4 times higher if only the bottom filter surfaces are used effectively.

As a further illustrative example, consider an array of rectangular filter elements (26) of the type shown in FIGS. 5 and 6 installed in a reservoir that has internal dimensions of approximately 1000 mm long and 500 mm wide. Assuming that there are 50 filter elements, each being 500 mm long×100 mm deep, spaced 20 mm apart, such an array could fit horizontally within the 1000 mm×500 mm reservoir. The effective filter flow area of each filter element would be about 500 mm×100 mm×2 sides=0.1 m². There are 50 such elements, thus yielding a total filter area of about 5 m². By comparison a single layer of a porous filter medium occupying the same horizontal area within the reservoir would have an effective filter area of about 1000 mm×500 mm=0.5 m². Thus the array of Double Sided Filter Elements shown in FIGS. 5 and 6 can provide approximately ten times the flow area within the same size reservoir.

In FIGS. 4 and 5 fluid connections, inlets, outlets etc are omitted for clarity.

Recovery of Oily Process Liquid

It is expected that the method described herein will be useful to recover oily Process Liquid from feed slurries that contain said oily Process Liquid. The term "oily Process Liquid" includes Process Liquids comprised of one or more liquid components selected from the group consisting of: crude oil; liquified petroleum gas (LPG); natural gasoline; naphtha; kerosene; fuel oil; gas oil; diesel; refined gasoline; other hydrocarbon fuels; gas condensate; organic solvents; lubricating oils; organic power transmission oils; organic heat transfer fluids; oil-miscible ionic liquids; tower bottom liquids in oil refineries; other refined hydrocarbon liquids; organic polymers; organic coolants; organic fluids used in metal cutting and metal forming; organic solvents; synthetic oil; organic mother liquors used in crystallisation processes; liquid components of oil based or synthetic based drilling muds (commonly known as OBM and SBM) used in the oil and gas industry when drilling wells; oily liquids contained in slurries removed from equipment and piping during descaling or cleaning operations; organic automotive and aircraft fluids; organic liquids used during the manufacture of cosmetics, pharmaceuticals, plastics, petrochemicals, pulp and paper products and electronics; toxic organic industrial liquid effluent; other non-polar liquids not included above; and combinations thereof.

The solid particles in feed slurries that contain oily Process Liquid can comprise a wide range of solid matter, including but not limited to: sand, clay, rock, coal, metal, ash, grit, glass, ceramic, plastics, rust, scale, dirt, plant matter, debris, salts, minerals, ores, crystals, catalysts, proppant, well drilling cuttings, coking fines, molecular-sieve beads, granular filtration media, weighting agents, chemical reaction products, and radioactive matter. Said solid particles can typically have a size between 0.01 and 1,000 microns. However, the method is not limited to any particular size of solid particles or type or shape or composition of solid matter that may be in the feed slurry.

In many of these cases a suitable Sweep Liquid can be watery and mostly comprise one or more liquid components selected from the group consisting of: water, brine (meaning water containing dissolved salts); alcohols; glycols; amines; and other water soluble liquids and combinations thereof. In many cases water or brine will be a desirable component of the Sweep Liquid due to: low cost; low risk of harm to people or the environment; significantly higher density than the oily Process Liquid, and; not more than sparing solubility of either liquid in the other. Hence the oily Process Liquid will typically float on top of the Sweep Liquid and would typically readily separate from the Sweep Liquid if the two liquids were to be stirred or agitated together assuming such mixing is done in a manner that avoids the formation of a troublesome emulsion. In many applications the performance of the method can be improved by including as components of the Sweep Liquid solvents, surfactants or other adhesion disruptors that promote, improve or otherwise aid the separation of oily Process Liquid from solid particles.

In the following description of an example only of how to apply the method to recover oily Process Liquids, there is Thickening followed by the Sweep Mode of operation. Referring to the preceding paragraphs and Figures, the following is an example of a sequence of steps, out of many possible sequences that are included in the method described herein:

Step A. Put oily feed slurry and watery Sweep Liquid into Inlet Chamber (2) to begin filling Inlet Chamber (2). This step causes the formation of an oily Process Liquid Layer (14) that floats above a watery Sweep Liquid Layer (15) in Inlet Chamber (2). In some applications it may be acceptable to allow extensive mixing of the fluids together as they enter Inlet Chamber (2) if it is known that they will subsequently separate again in a satisfactory manner, as can be the case when some oils are mixed with water. However in many other applications it will be advisable to avoid unnecessary mixing of the two fluids so as to avoid emulsions and/or to shorten the time it takes for the Process Liquid and Sweep Liquid to separate and migrate into the Process Liquid Layer (14) and Sweep Liquid Layer (15) respectively.

The feed slurry entering the Inlet Chamber (2) comprises Process Liquid that is mixed with solid particles. Contact between the Process Liquid and Sweep Liquid during this filling step combined with gravity can cause some particles to move from the Process Liquid into the Sweep Liquid, which can be a helpful start to the process of separating Process Liquid from the solid matter.

Step B. When the desired amount of Sweep Liquid has entered and filled the bottom part of Inlet Chamber (2) stop the flow of Sweep Liquid into Inlet Chamber (2), thereby fixing the volume of Sweep Liquid in Inlet Chamber (2) during this part of the method. Ensure the supply of feed slurry is adequately pressurised (e.g. by a pump or head of liquid) to a sufficient level to generate the TMP. Allow feed slurry to continue entering Inlet Chamber (2). The Inlet Chamber (2) will become totally full of liquid after which the Process Liquid Layer (14) can no longer freely expand—it is essentially locked in between the fixed volume of Sweep Liquid below it and Filtering Device (1, 24). The fluid pressure in Inlet Chamber (2) will therefore rise because of the pressurised supply of feed slurry. This creates a rising pressure differential between Inlet Chamber (2) and Outlet Chamber (3), which, once it reaches a satisfactory magnitude, is the TMP needed to push filtrate through Filtering Device (1, 24) at a satisfactory filtrate flow rate. The TMP can also be increased or generated to a limited degree by pulling a vacuum in Outlet Chamber (3). The TMP will cause Process Liquid to begin to flow through Filtering Device (1, 24) into Outlet Chamber (3) as filtrate. As Process Liquid flows through Filtering Device (1, 24) more pressurised feed slurry enters Inlet Chamber (2) on an equal volume basis i.e. for each litre of Process Liquid filtrate that leaves Inlet Chamber (2) through Filtering Device (1, 24) a litre of pressurised feed slurry will enter Inlet Chamber (2).

Step C. Operate the SAP Means to avoid creating a troublesome accumulation of solid matter on or within the upstream surface of Filtering Device (1, 24) and allow filtration to continue. As more Process Liquid flows through Filtering Device (1, 24) and is replaced by equal volumes of feed slurry, the quantity of solid matter in the Process Liquid Layer (14) in Inlet Chamber (2) will rise, assuming the rate of migration of solid particles from the Process Liquid Layer (14) into the Sweep Liquid Layer (15) is less than the rate at which solid particles enter Inlet Chamber (2), thereby thickening the feed slurry, i.e. increasing its percentage solids content.

Step D. When the desired degree of feed slurry thickening has been reached and the user wishes to begin the Sweep Mode, stop the flow of slurry into Inlet Chamber (2) and resume the flow of Sweep Liquid into Inlet Chamber (2) at a sufficient pressure (e.g. via a pump or head of liquid) equivalent to the desired TMP to maintain satisfactory rate of filtrate flow through Filtering Device (1, 24).

Step E. Continue Sweep Mode including flowing Sweep Liquid into Inlet Chamber (2) which causes liquid (i.e. filtrate) to continue to flow through Filtering Device (1, 24). Operate the SAP Means and control the TMP as necessary to maintain a satisfactory filtrate flow rate. This filtrate is, during at least the early Sweep Mode steps, mostly Process Liquid, whereas the liquid that is entering Inlet Chamber (2) is Sweep Liquid. Hence this step causes the displacement of Process Liquid out of Inlet Chamber (2) by replacing it with Sweep Liquid. Solid particles that cannot pass through Filtering Device (1, 24) remain in the Inlet Chamber however the original liquid (i.e. Process Liquid) that these particles had been immersed in is being displaced, or "swept", by the rising level of Sweep Liquid during the execution of the Sweep Mode steps.

Step F. Continue the Sweep Mode, including flowing Sweep Liquid under pressure into Inlet Chamber (2), filtration, operation of SAP Means as needed, and collection of filtrate in Outlet Chamber (3) until the desired amount of Process Liquid has flowed into Outlet Chamber (3). The retentate in Inlet Chamber (2) becomes mostly comprised of Sweep Liquid and solid matter. Some of the solid particles in the retentate may have settled into a sediment while other particles that are typically smaller and/or comprised of lower density solid matter may be more widely distributed in the liquid. The Inlet Chamber (2) in the reservoir at the end of this step in the method contains a mixture comprising solid particles and Sweep Liquid.

The above list of steps can be extended by adding the step of removing from the reservoir (28) at least a portion of the mixture comprising solid particles and Sweep Liquid, said mixture having been created by performing the above steps. It is also possible to recover Process Liquid that has flowed through the Filtering Device (1, 24) because it has now been collected in Outlet Chamber (3). If a notably large quantity of Sweep Liquid had been used to maximise the recovery of Process Liquid from the feed slurry, then a large quantity of Sweep Liquid may also have flowed through Filtering Device (1, 24) into Outlet Chamber (3). In many cases this can be acceptable because the oily Process Liquid, in the absence of emulsions, will typically float on top of watery Sweep Liquid in Outlet Chamber (3), thereby enabling recovery of Process Liquid. Said recovery of the oily Process Liquid from the surface of the watery Sweep Liquid can be readily achieved via many conventional methods presently used in, for example, the oil and gas industry to separate and remove a layer of oil from the surface of a layer of aqueous liquid and need not be described herein.

A person skilled in the art will recognise that there are many feasible modifications, herein termed "Modifications", that could be made to the above described operational sequence of Steps A to F depending upon the details of particular applications. Non-limiting examples of Modifications that may optionally be included in embodiments of the method in this specification include:

1) Operation of the method is not necessarily limited to batch by batch. For example as the solids content of the slurry below Filtering Device (1, 24) rises, then the rate at which particles move from the Process Liquid Layer (14) into the Sweep Liquid Layer (15) may also rise and can potentially approach the rate at which fresh solid matter enters Inlet Chamber (2) as a component of the feed slurry such as during Step C. The duration of Step C can thereby be significantly extended and resemble continuous operation because the slurry stops, or almost stops, becoming thicker.
2) Steps A and B can be revised to delete the flow of Sweep Liquid into Inlet Chamber (2). Filling of Inlet Chamber (2) by feed slurry alone, application of TMP and operation of the SAP Means to create the conditions needed for effective filtration is feasible. The first introduction of Sweep Liquid can be delayed until Step D when Sweep Mode begins, which means that the movement of particles from the Process Liquid Layer (14) into the Sweep Liquid Layer (15) can no longer start before Step D. The absence of Sweep Liquid during Step C can enable SAP Means to be operated in a particularly vigorous manner so as to maximise the filtrate flow rate.
3) There is no requirement to have a defined separate Thickening mode of operation. Slurry thickening may (or may not) occur as a consequence of flowing feed slurry and Sweep Liquid into Inlet Chamber (2), generating the necessary level of TMP, operating the SAP Means and flowing filtrate through Filtering Device (1, 24).
4) The method may be paused to withdraw slurry from or add slurry into Inlet Chamber (2).
5) One or more adhesion disruptors can be added to the feed slurry and/or Process Liquid Layer (14) and/or Sweep Liquid Layer (15) to promote or enhance or otherwise aid the separation of Process Liquid from solid particles, and/or aid the separation of solid matter (if present) from the upstream surface of the Filtering Device.
6) The Sweep Liquid can, in some applications, comprise two (or more) liquid components that have densities higher than that of the Process Liquid but different from each other. The separate liquid components of the Sweep Liquid would be introduced into Inlet Chamber (2) separately so as to create a number of sub-layers of liquids of different densities within the overall Sweep Liquid layer. This can be readily achieved even if the liquid components of the Sweep Liquid are miscible with each other. Methods by which stacked layers of miscible liquids having different densities can be created in a reservoir and put to good use are described in U.S. Pat. No. 8,728,321 and US 20140374365, both of which are entirely incorporated herein by reference. The uppermost layer of Sweep Liquid, which is in contact with the feed slurry, would have a lower density than the other components of the Sweep Liquid, while still having a higher density than, and being not significantly soluble in, the Process Liquid. This uppermost layer of Sweep Liquid, herein termed "stripping Sweep Liquid", will be in contact with the slurry in the Process Liquid Layer (14), and can optionally include one or more adhesion disruptors to help strip Process Liquid from between and/or from the surfaces of solid particles in the slurry that it comes into contact with. The solid particles that have been stripped of Process Liquid are no longer bound to low density liquid and can then more readily descend through the remaining layers of Sweep Liquid. If this uppermost layer of "stripping Sweep Liquid" becomes spent or otherwise ineffective it can be bled off and replaced by fresh stripping Sweep Liquid that will slide into the same space previously occupied by the spent stripping Sweep Liquid because of its particular density (i.e. heavier than Process Liquid but lighter than the other liquids in the Sweep Liquid Layer (15)).
7) In applications where there is a recirculating slurry flow pattern (18) created with the help of Slurry Deflector (19) then it can be advantageous to hold interface (16) between the Process Liquid Layer (14) and Sweep Liquid Layer (15) at approximately the same level as the Slurry Deflector (19). This is an example of a potential way to create a stripping recirculating flow pattern. Some of the solid particles that are carried in the slurry horizontally inward from the wall of Inlet Chamber (2) will strike the slower moving (or non-moving) liquid at the top of the Sweep Liquid Layer (15). This will result in movement of particles through the Sweep Liquid. The drag forces acting on the moving particles will in some applications help to strip Process Liquid from the particle surfaces. Some particles may dissolve upon contact with Sweep Liquid. Some particles will slow down and settle out of the Process Liquid Layer (14) through the Sweep Liquid Layer (15).
8) When a Sweep Liquid layer is present in Inlet Chamber (2) it can be beneficial in some applications to flow feed slurry into Inlet Chamber (2), such as during Step B, from a low level such that a stream of feed slurry rises through the Sweep Liquid layer due to its density being lower than that of the Sweep Liquid. Some of the solid particles in the upwardly moving feed slurry will therefore come into contact with the Sweep Liquid, which in turn can help strip Process Liquid from the particle surfaces. Solid particles that are thus stripped of the coating of low density oily Process Liquid can then more readily sink back down through the Sweep Liquid.
9) Heat and/or agitation and/or vibrations (e.g. ultrasonic) can be applied to at least some portions of the Sweep Liquid Layer (15) to help separate Process Liquid from particles that may be present and coated by a film of Process Liquid. Said separated Process Liquid may then rise out of the Sweep Liquid layer towards Filtering Device (1, 24). Heat and/or agitation and/or vibrations (e.g. ultrasonic) can also be applied to at least some portions of the Process Liquid Layer (14) to help reduce the attraction or adhesive forces between particles and Process Liquid. Said heat and/or agitation and/or vibrations may also help prevent particles from adhering to the upstream surface of Filtering Device (1, 24).
10) Electrostatic separation devices can be added whereby fine solid particles in the feed slurry in Inlet Chamber (2) are exposed to an electrostatic charge field so as to cause them to be attracted to beads that are introduced into Inlet Chamber (2). The beads are then removed and separated from the fine solid particles. Electrostatic separation is a well-known method of separating fine solid particles from oil slurries.

11) Thickening can be done in one apparatus, after which the Sweep Mode can be performed on the thickened slurry in a different apparatus.

12) Combinations of the above Modifications.

A person skilled in the art will recognise that in oil and gas production there are natural sources of high pressure (e.g. at the wellhead or the head of water at the seabed in subsea modules) at or near the same locations where it is desirable to separate oily Process Liquids from solid particles. The method described herein potentially provides a means to take advantage of these sources of high pressure at oil and gas production sites to perform filtration and recovery of oily Process Liquids at high levels of TMP.

A person skilled in the art will also recognise that the treatment of slurries during oil and gas production to separate solid particles, such as well drill cuttings or other solid matter from oily Process Liquids, such as drilling fluids, can be particularly challenging. In many such cases industry specific solid-liquid separation systems are being used that include mechanical and thermal separation devices (e.g. shale shakers, hydro-cyclones, centrifuges, hammermills, thermal desorption units and the like). Many of these separation systems are only partially successful in breaking the attraction or adhesive forces between oily Process Liquids and solid cuttings particles.

The method described herein is expected to be useful in augmenting, enhancing or replacing industry specific solid-liquid separation systems.

The method offers several options to effectively recover oily Process Liquid from slurries using a watery Sweep Liquid and an example is described below under the heading Example 1 Recovery of Oil Based Drilling Fluid from Fine Cuttings Slurries.

Recovery of Non-Oily Process Liquid Using Soluble Sweep Liquid

The term "non-oily Process Liquid" means Process Liquid that comprises one or more liquid components that are very soluble in water. An example of a non-oily Process Liquids would be a Process Liquid that comprises one or more alcohols, and/or one or more glycols, and/or one or more amines. The use of a watery Sweep Liquid in these applications can remain generally desirable because such liquids are often low cost and pose relatively low risk of harm to personnel or the environment. However a watery Sweep Liquid introduces a risk of forming a solution of Process Liquid and Sweep Liquid with the consequential risk of diluting the Process Liquid with watery Sweep Liquid and/or contaminating the Sweep Liquid with Process Liquid that may be harmful.

Many water soluble non-oily Process Liquid will have a higher density than the oily Process Liquid discussed under the heading Recovery of Oily Process Liquid. Nevertheless in many cases there are readily available ways to create a watery Sweep Liquid that has higher density than these water soluble non-oily Process Liquids. For example brines comprised of water and dissolved salt can have a wide range of densities. Sodium chloride brine has a density up to 1.2 g/ml. With calcium chloride the brine density can be raised to 1.4 g/ml. If the dissolved salt is calcium bromide then the Sweep Liquid density can be raised to over 1.8 g/ml. The method described herein can use these heavy brines in many cases to efficiently recover many Process Liquids including both oily Process Liquid and non-oily Process Liquid.

In applications where the Process Liquid and Sweep Liquid are significantly soluble, one in the other, the previously described method Steps A to F and Modifications remain broadly applicable in general but with the added requirement or preference to carry out the method without causing excessive mixing of Process Liquid and Sweep Liquid which otherwise could create undesirably large quantities of Process Liquid-Sweep Liquid solution.

In these applications FIGS. 1 to 6 remain applicable. The creation and preservation of separate liquid layers in the reservoir, which are objectives of Steps A to F, can readily be achieved even in applications where the Process Liquid and Sweep Liquid are miscible in each other. Several ways to do so are described in U.S. Pat. No. 8,728,321 and US 20140374365. For example, during steps when both feed slurry and Sweep Liquid enter the Inlet Chamber (2) one option is to put feed slurry into Inlet Chamber (2) first and then add Sweep Liquid slowly from below so as to form a gradually expanding layer of Sweep Liquid that pushes upwards against the lower density layer of Process Liquid above it. Alternatively the Sweep Liquid can be put in first and then the feed slurry can be gently added (e.g. by spraying) on top to form a Process Liquid Layer (14) floating on top of the Sweep Liquid Layer (15).

When Inlet Chamber (2) contains a Sweep Liquid Layer (15) and Process Liquid Layer (14) more Sweep Liquid can be added at a low level without disturbing the upper portion of the Sweep Liquid Layer (15) that pushes upwards against the Process Liquid above it. This is effective because the heavier liquid (Sweep Liquid) is introduced below the lighter liquid (Process Liquid). In the absence of stirring or agitation or other sources of turbulence, gravity will act on the density difference between the liquids thus tending to keep the Sweep Liquid below the Process Liquid and avoid unnecessary mixing. For similar reasons, feed slurry, which contains the lighter liquid (Process Liquid), can be added to Inlet Chamber (2) at a high level into the Process Liquid Layer (14) and, in the absence of stirring or agitation or other sources of turbulence, gravity will again act on the density difference between the liquids thus tending to keep the Process Liquid above the Sweep Liquid and avoid unnecessary mixing.

Nevertheless during the performance of the method some mixing of Process Liquid and Sweep Liquid is unavoidable because of, for example, the turbulence created by the SAP Means, the movement of solid particles from the Process Liquid Layer (14) into the Sweep Liquid Layer (15) and the fact that at least some Process Liquid is in contact with some Sweep Liquid. However, the method described herein is designed and configured to avoid excessive mixing of the two liquids.

The interface (16) between the Process Liquid Layer (14) and Sweep Liquid Layer (15) will contain some Process Liquid-Sweep Liquid solution hence its thickness is an indicator of how much Process Liquid-Sweep Liquid mixing has occurred. In applications in which the user wants to limit the amount of mixing of Process Liquid and Sweep Liquid the user may choose types of SAP Means, and how they are operated, so as to avoid excessive mixing of Process Liquid with Sweep Liquid.

The use of a SAP Means that creates a recirculating slurry flow pattern (18) can in some applications remain viable. In these cases the apparatus is expected to include Slurry Deflector (19) plus apparatus to avoid excessive mixing of the two liquids and apparatus to keep the level of Slurry Deflector (19) at approximately the same level as interface (16) between the Process Liquid Layer (14) and the Sweep Liquid Layer (15). FIG. 1 shows a potential example of Slurry Deflector (19) in the form of an annular ring to turn the downward moving slurry towards the centre as described earlier. Vanes, plates, baffles and the like (not shown in the Figures) would be added as necessary to dampen, reduce or otherwise limit the transmission of the turbulence created by the SAP Means in the Process Liquid Layer (14) above the Slurry Deflector (19) to the Sweep Liquid Layer (15) below the Slurry Deflector (19). Some of the solid particles that move horizontally inward with the slurry from the wall of Inlet Chamber (2) and across the central opening of Slurry Deflector (19) will mix with slower moving or stationary Sweep Liquid, thus creating drag forces that help to strip Process Liquid from the surfaces of the solid particles. The particles will slow down and some will consequently settle downwards through the Sweep Liquid Layer (15). The above describes one non-limiting example of a potential way to create a stripping recirculating flow pattern.

Another option is to carry out the Thickening mode without having Sweep Liquid in the apparatus, i.e. apply Modification 2, which enables vigorous use of the SAP Means so as to enable the TMP to be raised to high levels and thereby achieve the highest possible filtrate flow rate without any mixing of Sweep Liquid.

During Sweep Mode the pressurised Sweep Liquid generates the desired TMP (optionally with the assistance of a vacuum in Outlet Chamber (3) as described earlier), filtration continues and the SAP Means is operated in a manner that both prevents unwanted accumulation of solid matter on Filtering Device (1, 24) and avoids excessive mixing of Process Liquid and Sweep Liquid.

Overall the method offers several ways to recover non-oily Process Liquid from slurries. An example is described below under the heading Example 2 Recovery of Glycol from Salty Slurries.

Example 1 Recovery of Oily Drilling Fluid from Fine Cuttings

Oily drilling fluids or "drilling mud" are used during the drilling of oil and gas wells to lubricate and cool the rotary bit and to carry rock fragments (known as cuttings) in a slurry back to the drilling rig. At the drilling rig the larger rock particles are screened by shale shakers and the like. The underflow from such equipment typically comprises a slurry containing drilling fluid mixed with the finer (i.e. smaller sized) cuttings. The subsequent separation and recovery of the oily drilling fluid is often challenging because in many drilling situations the fine cuttings do not readily separate from the drilling fluid by settling or centrifugation due to forces of attraction between the oily drilling fluid and the rock particles.

The procedures described herein offers a method to potentially improve the way that oily drilling fluids are separated and recovered from such cuttings mixtures. In this application example the Process Liquid, i.e. the liquid phase of the drilling fluid, is oily and has a density that is well below that of water (fresh or salty) thus suggesting the use of a watery Sweep Liquid.

During experiments on mixtures of fine drill cuttings and used drilling fluid produced at well sites in New Zealand in 2016 some samples of said mixtures were observed to have a high solids content and to be globular or gel like, and difficult if not impossible to separate into solid and liquid phases using conventional methods and equipment. However the Applicant discovered that one or more adhesion disruptors, could be added to aqueous solutions that when mixed with the fine cuttings mixtures could disrupt, break or otherwise reduce the degree of attraction between the fine rock particles and the oily drilling fluid, which was mostly composed of SARALINE 185 (supplied by Shell Chemicals).

The Applicant has discovered that a range of substances have the potential to be effective as adhesion disruptors. The selection of which of these substances to use depends strongly on the properties of the cuttings and the drilling fluid. Examples of substances that were found to aid the separation of fine cuttings from drilling fluid, at least for some of the NZ samples, include: cuttings reactive acid (e.g. hydrofluoric acid and related acids), base (e.g. sodium hydroxide), alkaline substance (e.g. sodium carbonate), solvents (e.g. petroleum ether), and surfactants (e.g. DOW TERGITOL™ NP7).

If, as might at times be expected based on the New Zealand experiments, the fine cuttings mixture is not flowable it can be diluted with the base oil of the drilling fluid (e.g. SARALINE 185 for the New Zealand example) so as to improve its flowability, thus creating a flowable fine cuttings slurry ready for treatment by the method described herein.

It is expected that some fine cuttings slurries having high solids content will not require thickening before starting the Sweep Mode of operation of the method. In these cases the method could skip Step C and proceed with Steps D, E and F.

A feasible SAP Means as shown on FIG. 1 and described earlier could include a rotating Agitator (17), coupled with a Slurry Deflector (19). One or more adhesion disruptors would be added to at least the uppermost portion of the watery Sweep Liquid Layer (15) and the level of Slurry Deflector (19) would be maintained close to the level of interface (16) between the layer of drilling fluid (i.e. the Process Liquid Layer (14)) and the Sweep Liquid Layer (15) such that the fluid above Slurry Deflector (19) would be mostly a mixture of drilling fluid and fine cuttings. The SAP Means would be operated to create an effective stripping recirculating flow pattern. Some cuttings particles that move across the central opening of Slurry Deflector (19) would therefore make contact with the stationary or slower moving upper portion of the Sweep Liquid Layer (15). These cuttings particles would thereby be exposed to one or more adhesion disruptors in at least this portion of the Sweep Liquid Layer (15), which would then help to strip drilling fluid from between and/or from the surfaces of said cuttings particles. At least some of said fine cuttings, now separated from the lower density oily drilling fluid, would then settle through the Sweep Liquid Layer (15) or become more widely distributed in the Sweep Liquid.

Sweep Mode, including addition of Sweep Liquid, filtration through Filtering Device (1, 24), operation of SAP Means when necessary, collection of recovered drilling fluid in Outlet Chamber (3), and, optionally, the addition of more feed slurry, would continue until the desired amount of drilling fluid has been recovered as filtrate. Over time most of the solid particles that had been carried into Inlet Chamber (2) with feed slurry and then blocked or intercepted by Filtering Device (1, 24) will end up immersed in watery Sweep Liquid potentially ready for disposal without further treatment.

Example 2 Recovery of Glycol from Salty Slurries

At many offshore producing gas fields it is common practice to inject concentrated aqueous solutions of glycol, typically mono-ethylene glycol ("MEG"), into the crude gas stream to avoid hydrate formation in the high pressure offshore gas pipelines. At the receiving facility the MEG is recovered and reused. The recovery process typically entails separation and removal of water and various unwanted dissolved salts plus solid particles from the used MEG.

The method described herein offers a novel way to separate and remove solid particles, including calcium carbonate, fine corrosion products, magnesium hydroxide, salt crystals and similar solid particles from MEG solutions that, as noted above, are used for hydrate inhibition at gas fields. In this application the MEG solution is the Process Liquid and the Sweep Liquid is typically a salt saturated brine having a density of between 1.2 and 1.5 g/ml. The MEG solution would typically have a density of less than 1.2 g/ml, noting that most of the salt encountered during gas production is less soluble in MEG than in water, hence salt saturated MEG solutions typically have lower density than salt saturated brine. This intrinsic density difference is useful in the application of the method to these types of MEG slurries. The Sweep Liquid would typically be a high density brine comprised of water and readily available salts such as sodium chloride, potassium chloride, calcium chloride, calcium bromide, sodium formate, potassium formate, zinc bromide and/or cesium formate. In this application the MEG solution (the Process Liquid) is essentially miscible with the Sweep Liquid because MEG is miscible with water.

The density difference between the MEG solution and the brine enables the creation of a Process Liquid Layer (14) floating over a Sweep Liquid Layer (15) despite the miscibility of the two liquids. A further example of a method in which a salty MEG solution floats on brine is described in U.S. Pat. No. 8,728,321. A person skilled in the art will recognise that the method of U.S. Pat. No. 8,728,321, which has no filtration step, can be effective to separate relatively large crystals of sodium chloride, and similar salts that settle well, from MEG solutions. The present method goes beyond U.S. Pat. No. 8,728,321 to enable application to MEG mixtures with both large and small particles. In order to overcome the disadvantages of long settling times exhibited by small particles, the present method includes an upflow filtration step.

The method described in the specification of U.S. Pat. No. 8,728,321 may be included in the present method and includes a method to separate Process Liquid that includes one or more water miscible liquid components (e.g. alcohol, glycol, amine etc) from a feed slurry that comprises a mixture of said Process Liquid and solid particles, the method comprising placing the feed slurry of Process Liquid and solid particles into a reservoir;

introducing beneath the feed slurry a Sweep Liquid having a density greater than the density of the Process Liquid and which comprises one or more liquid components that are water miscible, and allowing at least a portion of said introduced Sweep Liquid to move upwards through at least a portion of the feed slurry wherein the passage of the portion of Sweep Liquid through the portion of the feed slurry displaces and lifts upwards at least a portion of the Process Liquid.

In the present method a filtration step is added to the above list of steps as follows: allowing at least a portion of said displaced and upwardly lifted Process Liquid to flow through a Filtering Device that is configured to block the passage of at least a portion of the solid matter in said mixture of Process Liquid and solid matter, thereby separating said portion of Process Liquid from said portion of solid matter.

A further embodiment further adds the step of using one or more SAP Means as described earlier to prevent excessive accumulation of solid matter on or within the upstream surface of Filtering Device (1, 24).

A still further embodiment further adds the step of avoiding excessive mixing of Process Liquid and Sweep Liquid.

The Applicant has conducted experiments on MEG slurries comprised of concentrated aqueous MEG solutions saturated with sodium chloride and mixed with sodium chloride crystals and calcium carbonate particles to test the effectiveness of the present method. Observations from these experiments indicate that when treating similar MEG slurries a brine having a density in the range of 1.2 to 1.4 g/ml may be an effective Sweep Liquid. The Applicant suggests relatively harmless mineral salts may be dissolved in water to create this Sweep Liquid.

Observations by the Applicant at several operating gas fields worldwide indicate that a typical MEG slurry of the type described above that can be encountered during operation of hydrate inhibition systems comprises concentrated MEG solution saturated in dissolved mineral salts, 2% to 15 wt % salt crystals (typically sodium chloride) and 0.5% to 5 wt % finer particles (for example calcium carbonate, iron carbonate, iron oxide, magnesium hydroxide etc). The present method on its own or in conjunction with the method described in U.S. Pat. No. 8,728,321, offers a novel way to recover concentrated MEG solution from such MEG slurries.

Further experiments using ceramic Double Sided Filter Elements such as those shown in FIG. 3 indicate that this type of filter element performs well on the above described MEG slurries. One non-limiting example of a potentially feasible version of the method to treat such MEG slurries would include operation of components similar to those shown in FIG. 5. Applicant has discovered that a type of Double Sided Filter Element having pore sizes that are between 0.2 and 2 micron has been found to be effective for this application. Referring to FIG. 5, a potentially feasible sequence of steps to apply the method to this MEG recovery application is as follows:

a) Fill Inlet Chamber (2) with fresh MEG slurry.

b) Apply TMP to cause filtrate (i.e. MEG solution at this step of the method) to flow through Filtering Device (24) and be collected in Outlet Chamber (3).

c) Simultaneously operate SAP Means as needed to avoid excessive accumulation of solid matter on or within the upstream surfaces of Filtering Device (24) but in such a way as to allow heavier salt particles (e.g. sodium chloride crystals) to settle towards the bottom of Inlet Chamber (2)

d) Continue filtration, operation of SAP Means as needed, and flowing fresh MEG slurry into Inlet Chamber (2) until the slurry has been thickened, noting that Applicant has observed that thickening this type of MEG slurry to 20 to 30 wt % is an effective and achievable objective at which condition the slurry remains free flowing and ready for Sweep Mode e) Initiate Sweep Mode by introducing Sweep Liquid comprised of water and dissolved salts and having a density that is in one non-limiting embodiment more than 0.03 g/ml higher than the density of the MEG solution, or preferably more than 0.10 g/ml higher than the density of the MEG solution, into the bottom of Inlet Chamber (2) thereby creating a rising level of Sweep Liquid that lifts MEG solution up out of sediment that may be at the bottom of Inlet Chamber (2) as well as helping to strip MEG solution from the surfaces of settling solid particles.

f) Continue Sweep Mode including filtration and operation of SAP Means as needed but in such a way as to avoid unnecessary mixing of MEG solution with Sweep Liquid, noting that Applicant has observed that periodic short bursts of backflow through Filtering Device (24) (i.e. SAP Means type (f) as described under the heading Solids Accumulation Prevention Means) is one potentially effective choice of SAP Means for this MEG recovery application.

g) Stop the method when a satisfactory quantity of MEG solution has been collected in Outlet Chamber (3), from which it can be recovered for reuse. At this point the fluid in the Inlet Chamber mostly comprises a waste mixture of solid particles and brine. In many cases such waste can be disposed of as is without further treatment based on the Applicant's observations that regulatory authorities in many offshore gas producing regions of the world allow overboard disposal of similar mixtures of brine and solid matter.

Further Clarifications and Definitions of Terms and Phrases

For the avoidance of ambiguity or doubt the following terms and phrases that are used in this specification are further defined and clarified:

The term "slurry" means a flowable mixture of solid particles and one or more liquid components.

The term "feed slurry" as used herein means the slurry that is introduced into the reservoir to be treated by one or more steps of the method.

The term "Process Liquid" as used herein means at least one of the liquid components of the feed slurry. The liquid in the feed slurry may comprise a single substance (which would be the Process Liquid), or a miscible solution of liquid substances which physically behaves like a single liquid in which case the Process Liquid is said miscible solution. For example in a feed slurry composed of gasoline and fine clay particles the gasoline, which is a miscible mixture of various hydrocarbon liquids, is the Process Liquid. If said feed slurry also contained water or another liquid that is non-miscible with and less valuable and/or harmful than gasoline, the Process Liquid would still be the gasoline noting that such a feed slurry would normally be left standing beforehand to separate out at least a portion of the less valuable or harmful non-miscible liquid components before being introduced into the Inlet Chamber (2).

The term "Process Liquid Layer" as used herein means the layer of liquid in the Inlet Chamber (2) comprising mostly Process Liquid that is created or enlarged by the introduction of feed slurry and/or Process Liquid into the Inlet Chamber (2).

The term "mostly" as used herein means more than 50 wt %.

The term "Sweep Liquid" as used herein means a liquid that has a higher density than the density of the Process Liquid and is introduced into Inlet Chamber (2) during performance of the method to create or enlarge a layer of liquid comprising mostly Sweep Liquid, herein termed Sweep Liquid Layer (15), below the Process Liquid Layer (14}. In theory the density difference between the Sweep Liquid and Process Liquid can range from very small to large. A density difference of less than 0.01 g/ml may be feasible in certain cases where the method is used to recover oily Process Liquid using a watery non-miscible Sweep Liquid as described above under the heading Recovery of Oily Process Liquid. In many such cases even if considerable mixing between Sweep Liquid and Process Liquid does occur because of, for example, turbulence caused by the SAP Means and/or the movement of solid particles that can entrain or carry Process Liquid deep into the Sweep Liquid Layer (15), at least some of the Process Liquid that had mixed with Sweep Liquid will separate and rise back up to the Process Liquid Layer (14), assuming an emulsion is not formed, after the SAP Means is turned down and/or the surfaces of the solid particles have been stripped of Process Liquid.

But such a small density difference may not work in all cases. Even if the Process Liquid and Sweep Liquid are not more than sparingly soluble one in the other it can be desirable to have a larger density difference so as to shorten the time it takes for mixtures of the two liquids to separate and to reduce the risk of forming emulsions. Furthermore if, for example, the Sweep Liquid and Process Liquid are significantly soluble in each other as described under the heading Recovery of Non-Oily Process Liquid Using Soluble Sweep Liquid it can be necessary to have a larger density difference so as to avoid unnecessary mixing of the two liquids, said unnecessary mixing being undesirable because it leads to the creation of an unwanted solution of the two liquids as explained previously. Overall, for most if not essentially all applications, a person skilled in the art will recognise that a larger density difference, in one non-limiting embodiment over 0.03 g/ml, or preferably over 0.10 g/ml, or more preferably over 0.20 g/ml is usually desirable because it helps to reduce the degree of mixing of Sweep Liquid with Process Liquid thereby enhancing the performance and efficiency of the method.

The term "interface" as used herein means the liquid region between the Process Liquid Layer (14) and the Sweep Liquid Layer (15). The interface may be narrow and resemble a sharp boundary in many cases in which the Sweep Liquid and Process Liquid are not more than sparingly soluble in each other and the SAP Means is not causing significant mixing of the two liquids. FIGS. 1 and 2 show by non-limiting example only a narrow boundary type of interface. In cases in which the above conditions for a narrow interface are not present then the interface will typically be wider.

The term "to aid" (or "aiding") as used herein means (or implies to suit the context) to do any one or more of the following: initiate, promote, facilitate, enable, help, increase, assist, improve, and/or enhance.

The term "filtrate" as used herein means the liquid that flows through the Filtering Device. It is also commonly known as permeate.

The term "Filtering Device" means a device located within the reservoir that contains one or more porous filter elements through which liquid can flow but which is configured to block the passage of at least a portion of the solid particles that are contained in the feed slurry. Said one or more filter elements may comprise a single porous sheet or membrane type of filter element or an array or assemblage of a number of filter elements. Item 1 in FIGS. 1 and 2 is a non-limiting illustrative example of the former and items 20 and 26 in FIGS. 4 and 5 are non-limiting illustrative examples of the latter. The upstream surface of Filtering Device (1, 24) comprises the upstream surfaces of said one or more filter element(s). Said one or more filter elements may be stationary or movable and are positioned such that the interface (16) between the Process Liquid Layer (14) and the Sweep Liquid Layer (15) lies below at least a portion of the upstream surface of the Filtering Device (1, 24), or preferably below at least half of the upstream surface of the Filtering Device (1, 24), or more preferably below at least 80% of the upstream surface of the Filtering Device (1, 24). A person skilled in the art will recognise that associated hardware items (e.g. physical supports, seals, attachments, mechanisms and the like) may also be necessary, but, for clarity, are not shown in the Figures).

The phrase "excessive accumulation of solid matter on or within the upstream surface" of Filtering Device (1, 24) means an unwanted accumulation of solid particles that could comprise particles that are, for example, embedded within and/or blocking the entrances to the pores of the filter element(s) in Filtering Device (1, 24), or accumulated in one or more unacceptably thick layers (e.g. filter cake) on the upstream surface of Filtering Device (1, 24). In all cases the phrase refers to any kind of accumulation of solid matter that is severe enough, or thick enough or impervious enough to cause in one non-limiting embodiment more than a 50% increase in the resistance to flow of filtrate through the Filtering Device, or in the alternative more than a 100% increase in the resistance to flow of filtrate through the Filtering Device.

The term "excessive mixing" as used herein applies to situations in which the Process Liquid and Sweep Liquid are more than sparingly soluble in each other. In such situations if Process Liquid and Sweep Liquid are mixed together then at least a portion of the mixed liquids will form a solution, which is generally undesirable because the intent of the method is to avoid diluting Process Liquid with Sweep Liquid and vice versa. Excessive mixing of Process Liquid and Sweep Liquid is deemed to occur if it causes, in one non-limiting embodiment, the dissolution of more than 1% of the Process Liquid into the Sweep Liquid Layer (14), or in the alternative more than 10% of the Process Liquid into the Sweep Liquid Layer (14).

The term "adhesion disruptor" as used herein means a substance that can be added to the feed slurry and/or Process Liquid Layer (14) and/or Sweep Liquid Layer (15) so as to enhance or enable or otherwise aid the separation of Process Liquid from at least a portion of the solid particles in the feed slurry and/or to enhance the performance of the SAP Means by causing or promoting or otherwise aiding the detachment of solid matter (if present) from the upstream surface of Filtering Device (1, 24). The method optionally includes the use of one or more adhesion disruptors selected from a broad group of potential candidates including: acids, bases, alkaline substances, demulsifiers, emulsion breakers, friction reducers, solvents, alcohols, dispersing agents, ionic liquids, surfactants, anti-agglomerants, coagulants, flocculants, and gel breakers. A person skilled in the art will recognise that many of the types of substances listed above are components of fluids used in oil and gas production, refining and other chemical industries. The above list is not exhaustive and the method can include the addition of any substances to the feed slurry and/or Process Liquid Layer and/or Sweep Liquid Layer and/or the reverse flow or back pulse or back wash liquid used in SAP Means type (f) that achieves the desired results, namely to aid the separation of Process Liquid from solid particles and/or aid the separation of solid matter (if present) from the upstream surface of the Filtering Device.

The term "recirculating slurry flow pattern" applies to the slurry in Process Liquid Layer (14) and means a repeating flow pattern comprising the following sequence of flow directions:

i. slurry flows outwards across at least a portion of the upstream surface of Filtering Device (1, 24) until it reaches the wall of Inlet Chamber (2)
ii. slurry turns to flow down along said wall
iii. slurry flow turns again to flow approximately horizontally inward away from said wall
iv. slurry flow turns again to flow upwards towards the upstream surface of Filtering Device (1, 24)

The above sequence i to iv then repeats. FIG. 1 illustrates how a rotating Agitator (17) in conjunction with Slurry Deflector (19) can create the recirculating flow pattern (18).

The term "stripping recirculating flow pattern" means a recirculating slurry flow pattern in which at least a portion of the slurry comes into contact with Sweep Liquid thereby causing some solid particles to move from the Process Liquid Layer and into the Sweep Liquid Layer.

As used herein, the term "about" in reference to a given parameter is inclusive of the stated value and has the meaning dictated by the context (e.g., it includes the degree of error associated with measurement of the given parameter).

As used herein, the terms "comprising," "including," "containing," "characterized by," and grammatical equivalents thereof are inclusive or open ended terms that do not exclude additional, unrecited elements or method acts, but also include the more restrictive terms "consisting of" and "consisting essentially of" and grammatical equivalents thereof.

As used herein, the term "may" with respect to a material, structure, feature or method act indicates that for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and accompanying drawings and do not connote or depend on any specific preference, orientation, or order, except where the context clearly indicates otherwise.

Additional Embodiments

The present method and its embodiments have been described in detail. However, the scope of the present method is not intended to be limited to the particular embodiments of the method described in the specification. Various modifications, substitutions, and variations can be made to the disclosed material without departing from the spirit and/or essential characteristics of the present method. Accordingly, a person skilled in the art will readily appreciate from the disclosure that later modifications, substitutions, and/or variations performing substantially the same function or achieving substantially the same result as embodiments described herein may be utilized according to such related embodiments of the present method.

In the foregoing specification, the method has been described with reference to specific embodiments thereof, and has been suggested as effective in providing effective methods for separating Process Liquid from a feed slurry and, by implication, separating Process Liquid from solid particles in said feed slurry. However, it will be evident that various modifications and changes may be made thereto without departing from the broader scope of the method as set forth in the appended claims. Accordingly, the specification is to be regarded in an illustrative rather than a restrictive sense. For example, other specific Process Liquids, feed slurries, Sweep Liquids, Filtering Devices, SAP Means, agitators, slurry deflectors, pressure differentials, flow patterns, individually known or to be developed but not specifically identified or tried in a particular method described therein, are anticipated to be within the scope of this method.

The present method may suitably comprise, consist or consist essentially of the elements disclosed and may be practiced in the absence of an element not disclosed. For instance, there may be provided a method for separating Process Liquid from a feed slurry that comprises, consists essentially thereof, or consists of, a mixture of the Process Liquid and solid particles by use of a Sweep Liquid that has a higher density than the Process Liquid, the method may consist essentially of or consist of (a) introducing the feed slurry into a reservoir thereby creating or enlarging a Process Liquid Layer, said reservoir comprising a Filtering Device having an upstream surface and comprising one or more filter elements allowing liquid to flow through it while blocking the passage of at least a portion of said solid particles, where (a) can occur before, after or at the same time as (b), and (b) introducing the Sweep Liquid into the reservoir thereby creating or enlarging a Sweep Liquid Layer below the Process Liquid Layer and an interface between the two liquid layers that lies below at least a portion of the upstream surface of the Filtering Device, where (b) can occur before, after or at the same time as (c), and (c) continuing to introduce feed slurry and/or Process Liquid and/or Sweep Liquid into the reservoir causing the top of the Process Liquid Layer to rise and make contact with the upstream surface of the Filtering Device, and (d) applying a pressure differential across at least one or more of the filter elements within the Filtering Device, wherein said pressure differential is sufficient to cause liquid to flow through the Filtering Device as filtrate thereby causing Process Liquid to flow through the Filtering Device and (e) operating one or more Solids Accumulation Prevention Means ("SAP Means") that are configured to prevent excessive accumulation of solid matter on or within the upstream surface of the Filtering Device, and (f) allowing solid particles in the Process Liquid Layer to move out of the Process Liquid Layer and into the Sweep Liquid Layer thereby separating Process Liquid from solid particles, and (g) raising the level of the top of the Sweep Liquid Layer within the reservoir thereby exerting upward pressure against the Process Liquid Layer thereby causing Process Liquid to flow through the Filtering Device thereby separating Process Liquid from solid particles that are blocked by the Filtering Device, and (h) allowing solid particles that have been separated from Process Liquid by steps (f) and (g) to accumulate in the Sweep Liquid Layer, thereby forming a mixture comprising solid particles and Sweep Liquid in the reservoir.

In another non-limiting embodiment there may be provided a method to separate Process Liquid that includes one or more water miscible liquid components from a feed slurry that comprises, consists essentially of, or consists of, said Process Liquid and solid particles, the method comprising or consisting essentially of or consisting of (a) placing the feed slurry of Process Liquid and solid particles into a reservoir; (b) introducing beneath at least a portion of said feed slurry a Sweep Liquid having a density greater than the density of the Process Liquid and which comprises, consists essentially of, or consists of, one or more liquid components that are water miscible; (c) allowing at least a portion of the introduced Sweep Liquid to move upwards through at least a portion of the feed slurry, wherein the passage of the portion of Sweep Liquid through the portion of the feed slurry displaces and lifts upwards at least a portion of the Process Liquid, and (d) allowing at least a portion of the displaced and upwardly lifted Process Liquid to flow through a Filtering Device having an upstream surface and configured to block the passage of at least a portion of the solid particles in the feed slurry, thereby separating at least a portion of the Process Liquid from at least a portion of the feed slurry. In one embodiment the methods of the method, further include applying heat and/or agitation and/or vibrations to at least a portion of the Process Liquid Layer and/or Sweep Liquid Layer wherein the heat and/or agitation and/or vibrations aid the separation of Process Liquid from solid particles.

The invention claimed is:

1. A method for separating Process Liquid from a feed slurry that comprises a mixture of the Process Liquid and solid particles by use of a Sweep Liquid that has a higher density than the Process Liquid, the method comprising:
   (a) introducing the feed slurry into a reservoir thereby creating or enlarging a Process Liquid Layer, said reservoir comprising a Filtering Device having an upstream surface and comprising one or more filter elements allowing liquid to flow through it while blocking the passage of at least a portion of said solid particles, where (a) can occur before, after or at the same time as (b);
   (b) introducing the Sweep Liquid into the reservoir thereby creating or enlarging a Sweep Liquid Layer below the Process Liquid Layer and an interface between the two liquid layers that lies below at least a portion of the upstream surface of the Filtering Device, where (b) can occur before, after or at the same time as (c);
   (c) continuing to introduce feed slurry and/or Process Liquid and/or Sweep Liquid into the reservoir causing the top of the Process Liquid Layer to rise and make contact with the upstream surface of the Filtering Device;
   (d) applying a pressure differential across at least one or more of the filter elements within the Filtering Device, wherein said pressure differential is sufficient to cause liquid to flow through the Filtering Device as filtrate thereby causing Process Liquid to flow through the Filtering Device;
   (e) operating one or more Solids Accumulation Prevention Means ("SAP Means") that are configured to prevent excessive accumulation of solid matter on or within the upstream surface of the Filtering Device;
   (f) allowing solid particles in the Process Liquid Layer to move out of the Process Liquid Layer and into the Sweep Liquid Layer thereby separating Process Liquid from solid particles;
   (g) raising the level of the top of the Sweep Liquid Layer within the reservoir thereby exerting upward pressure against the Process Liquid Layer thereby causing Process Liquid to flow through the Filtering Device thereby separating Process Liquid from solid particles that are blocked by the Filtering Device, and;
   (h) allowing solid particles that have been separated from Process Liquid by steps (f) and (g) to accumulate in the Sweep Liquid Layer, thereby forming a mixture comprising solid particles and Sweep Liquid in the reservoir.

2. The method as claimed in claim 1 further comprising removing from the reservoir at least a portion of the mixture comprising solid particles and Sweep Liquid.

3. The method as claimed in claim 1 further comprising recovering Process Liquid that has flowed through the Filtering Device.

4. The method as claimed in claim 1 wherein the Process Liquid and Sweep Liquid are not more than sparingly soluble one in the other.

5. The method as claimed in claim 1 step (f) wherein the movement of solid particles from the Process Liquid Layer into the Sweep Liquid Layer is caused by gravity.

6. The method as claimed in claim 1 wherein at least a portion of the slurry in the Process Liquid Layer moves in a stripping recirculating flow pattern thereby causing solid particles to make contact with Sweep Liquid and move from the Process Liquid Layer into the Sweep Liquid Layer.

7. The method as claimed in claim 1 wherein the Process Liquid comprises one or more liquid components selected from the group consisting of: crude oil; liquified petroleum gas (LPG); natural gasoline; naphtha; kerosene; fuel oil; gas oil; diesel; refined gasoline; hydrocarbon fuels; gas condensate; organic solvents; lubricating oils; organic power transmission oils; organic heat transfer fluids; oil-miscible ionic liquids; tower bottom liquids in oil refineries; refined hydrocarbon liquids; organic polymers; organic coolants; organic fluids used in metal cutting and metal forming; organic solvents; synthetic oil; organic mother liquors used in crystallisation processes; liquid components of oil based or synthetic based drilling muds (OBM or SBM) wells; oily liquids contained in slurries removed from equipment and piping during descaling or cleaning operations; organic automotive and aircraft fluids; organic liquids used during the manufacture of cosmetics, pharmaceuticals, plastics, petrochemicals, pulp and paper products and electronics; toxic organic industrial liquid effluent; non-polar liquids not included above; and combinations thereof.

8. The method as claimed in claim 1 wherein the Sweep Liquid comprises one or more liquid components selected from the group consisting of: water, brine; alcohols; glycols; amines; and combinations thereof.

9. The method as claimed in claim 1 further comprising adding one or more adhesion disruptors to the feed slurry and/or Process Liquid Layer and/or Sweep Liquid Layer thereby aiding the separation of Process Liquid from solid particles and/or aiding the separation of solid matter (if present) from the upstream surface of the Filtering Device.

10. The method as claimed in claim 1 wherein the one or more SAP Means are selected from the group consisting of:
moving liquid across at least a portion of the upstream surface of the Filtering Device, thereby detaching solid matter that has accumulated onto the upstream surface of the Filtering Device and/or preventing solid matter from accumulating onto the upstream surface of the Filtering Device;
rapidly moving the Filtering Device thereby detaching solid matter that has accumulated onto the upstream surface of the Filtering Device and/or preventing solid matter from accumulating onto the upstream surface of the Filtering Device;
moving a brush or blade across at least a portion of the upstream surface of Filtering Device thereby detaching, pushing or sweeping solid matter off the upstream surface of the Filtering Device;
moving the Filtering Device so that at least a portion of its upstream surface passes close to a brush or blade thereby detaching, pushing or sweeping solid matter off the upstream surface of the Filtering Device;
applying a reverse flow or back pulse or back wash of liquid or gas backwards through the Filtering Device thereby detaching solid matter that has built up on or within the upstream surface of the Filtering Device;
applying jolts, knocks, accelerations or vibrations to the Filtering Device or to the reservoir or to the slurry close to the Filtering Device thereby detaching solid matter from the upstream surface of the Filtering Device;
configuring and/or adapting the upstream surface of the Filtering Device to repel, or at least reduce or resist the adherence of, solid matter;
reducing the liquid flow rate through the Filtering Device thereby enabling gravity to cause solid particles in the liquid below the Filtering Device to settle;
causing solid matter that has accumulated onto the upstream surface of the Filtering Device to dissolve, melt, slide along, fall away or otherwise detach from, the upstream surface of the Filtering Device; and
any combination thereof.

11. The method as claimed in claim 10 wherein moving liquid across at least a portion of the upstream surface of the Filtering Device is created by a step selected from the group consisting of: operating an agitator that is submerged in the liquid that is close to the upstream surface of the Filtering Device thereby causing liquid to move across the upstream surface of the Filtering Device; pumping feed slurry or Process Liquid into the reservoir in a manner that is configured to cause liquid to flow across the upstream surface of the Filtering Device; and a combination thereof.

12. The method as claimed in claim 1 wherein the Filtering Device comprises one or more Double Sided Filter Elements.

13. The method as claimed in claim 12 wherein the one or more Double Sided Filter Elements comprise ceramic materials.

14. The method as claimed in claim 1 wherein the method further includes the step of applying heat and/or agitation and/or vibrations to at least a portion of the Process Liquid Layer and/or Sweep Liquid Layer wherein the heat and/or agitation and/or vibrations aid the separation of Process Liquid from solid particles.

15. The method as claimed in claim 10 wherein the method further includes the step of adding one or more adhesion disruptors to the reverse flow or back pulse or back wash of liquid or gas backwards through the Filtering Device thereby aiding the detachment of solid matter that could otherwise be blocking or impeding the flow of filtrate through the Filtering Device.

16. A method to separate Process Liquid that includes one or more water miscible liquid components from a feed slurry that comprises said Process Liquid and solid particles, the method comprising;
a) placing the feed slurry comprising Process Liquid and solid particles into a reservoir;
b) introducing beneath at least a portion of the feed slurry a Sweep Liquid having a density greater than the density of the Process Liquid and which comprises one or more liquid components that are water miscible;
c) allowing at least a portion of the introduced Sweep Liquid to move upwards through at least a portion of the feed slurry, wherein the passage of the portion of Sweep Liquid through the portion of the feed slurry displaces and lifts upwards at least a portion of the Process Liquid, and;

d) allowing at least a portion of the displaced and upwardly lifted Process Liquid to flow through a Filtering Device having an upstream surface and configured to block the passage of at least a portion of the solid particles in the feed slurry, thereby separating at least a portion of the Process Liquid from at least a portion of the feed slurry.

17. The method claimed in claim 16 further comprising operating a SAP Means to prevent excessive accumulation of solid matter on or within the upstream surface of the Filtering Device.

18. The method claimed in claim 16 wherein the Process Liquid comprises one or more alcohols, and/or one or more glycols, and/or one or more amines.

19. The method as claimed in claim 16 wherein the method further includes the step of applying heat and/or agitation and/or vibrations to at least a portion of the Process Liquid Layer and/or Sweep Liquid Layer, wherein the heat and/or agitation and/or vibrations aid the separation of Process Liquid from solid particles.

* * * * *